US010809348B2

(12) United States Patent
Zeng et al.

(10) Patent No.: US 10,809,348 B2
(45) Date of Patent: Oct. 20, 2020

(54) POSITIONING BASED ON PHASE AND TIME DIFFERENCES OF SIGNALS

(71) Applicant: Verizon Patent and Licensing Inc., Arlington, VA (US)

(72) Inventors: Yaojun Zeng, San Jose, CA (US); Shi-Jau Simon Wang, Sunnyvale, CA (US); Ray A. Sears, Jr., Auburn, CA (US); Sandeep Sharma, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 152 days.

(21) Appl. No.: 15/371,980

(22) Filed: Dec. 7, 2016

(65) Prior Publication Data

US 2018/0160393 A1    Jun. 7, 2018

(51) Int. Cl.
| | |
|---|---|
| *G01S 5/02* | (2010.01) |
| *G01S 5/06* | (2006.01) |
| *G01S 5/14* | (2006.01) |
| *G01S 13/74* | (2006.01) |
| *G01S 11/02* | (2010.01) |
| *H04W 64/00* | (2009.01) |

(52) U.S. Cl.
CPC .............. *G01S 5/0252* (2013.01); *G01S 5/06* (2013.01); *G01S 5/14* (2013.01); *G01S 11/02* (2013.01); *G01S 13/74* (2013.01); *H04W 64/00* (2013.01)

(58) Field of Classification Search
CPC ......... G01S 5/06; G01S 5/0252; G01R 29/08; H04W 64/006
See application file for complete search history.

(56) References Cited

U.S. PATENT DOCUMENTS

| | | | |
|---|---|---|---|
| 8,199,706 B2* | 6/2012 | Bertrand | H04L 27/2613 370/329 |
| 2010/0195566 A1* | 8/2010 | Krishnamurthy | H04L 5/0007 370/328 |
| 2010/0331009 A1* | 12/2010 | Krishnamurthy | G01S 5/0036 455/456.1 |
| 2016/0269980 A1* | 9/2016 | Simon | H04L 27/2613 |
| 2017/0135052 A1* | 5/2017 | Lei | H04J 13/0062 |

FOREIGN PATENT DOCUMENTS

WO    WO 2011160697 A1 *  12/2011 ............. G01S 5/021

\* cited by examiner

*Primary Examiner* — Matthew G Marini

(57) ABSTRACT

A method, a device, and a non-transitory storage medium provide to generate a first signal that includes a perfect polyphase-encoding of an identifier of the wireless station; transmit the first signal; receive from an end device, a second signal that is responsive to the first signal and includes a perfect polyphase-encoding of the identifier of the wireless station and an identifier of the end device; auto-correlate the first signal and the second signal; calculate in response to the autocorrelation, a time difference between the first signal and the second signal; calculate in response to the calculation, a phase difference between the first signal and the second signal; and calculate in response to the calculation of the phase difference, a distance between the wireless station and the end device based on the time difference, the phase difference, the identifier of the wireless station, and the identifier of the end device.

20 Claims, 20 Drawing Sheets

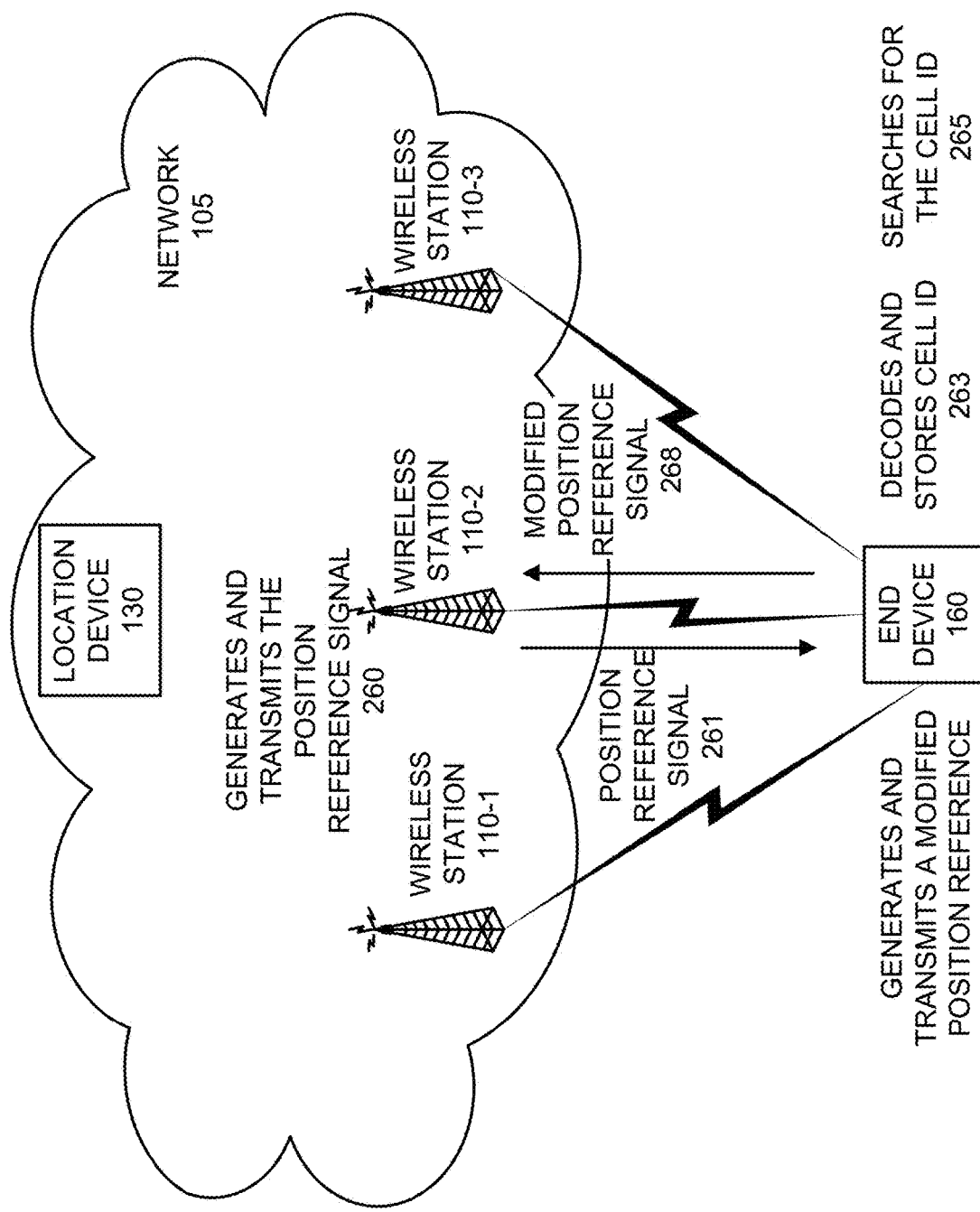

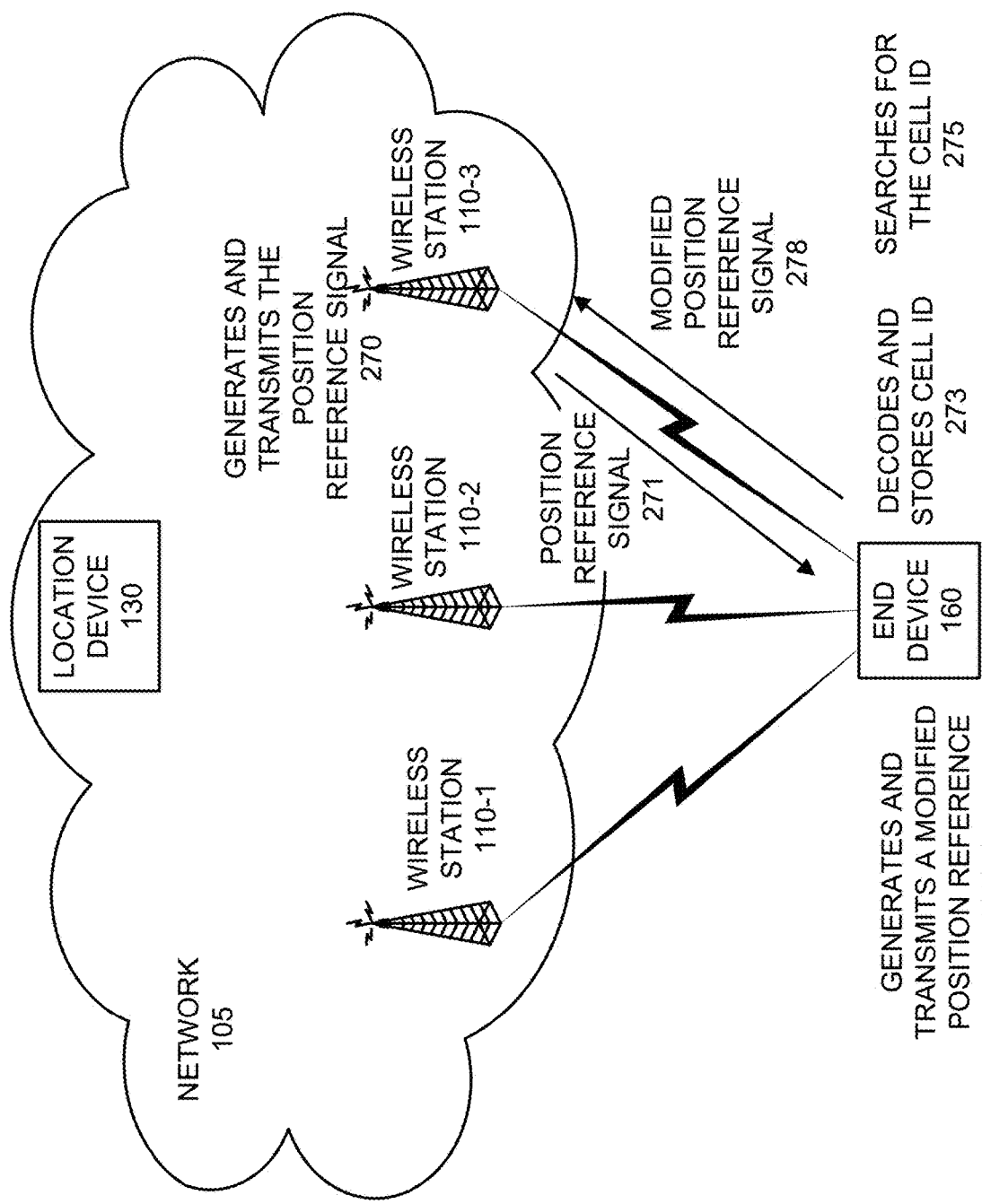

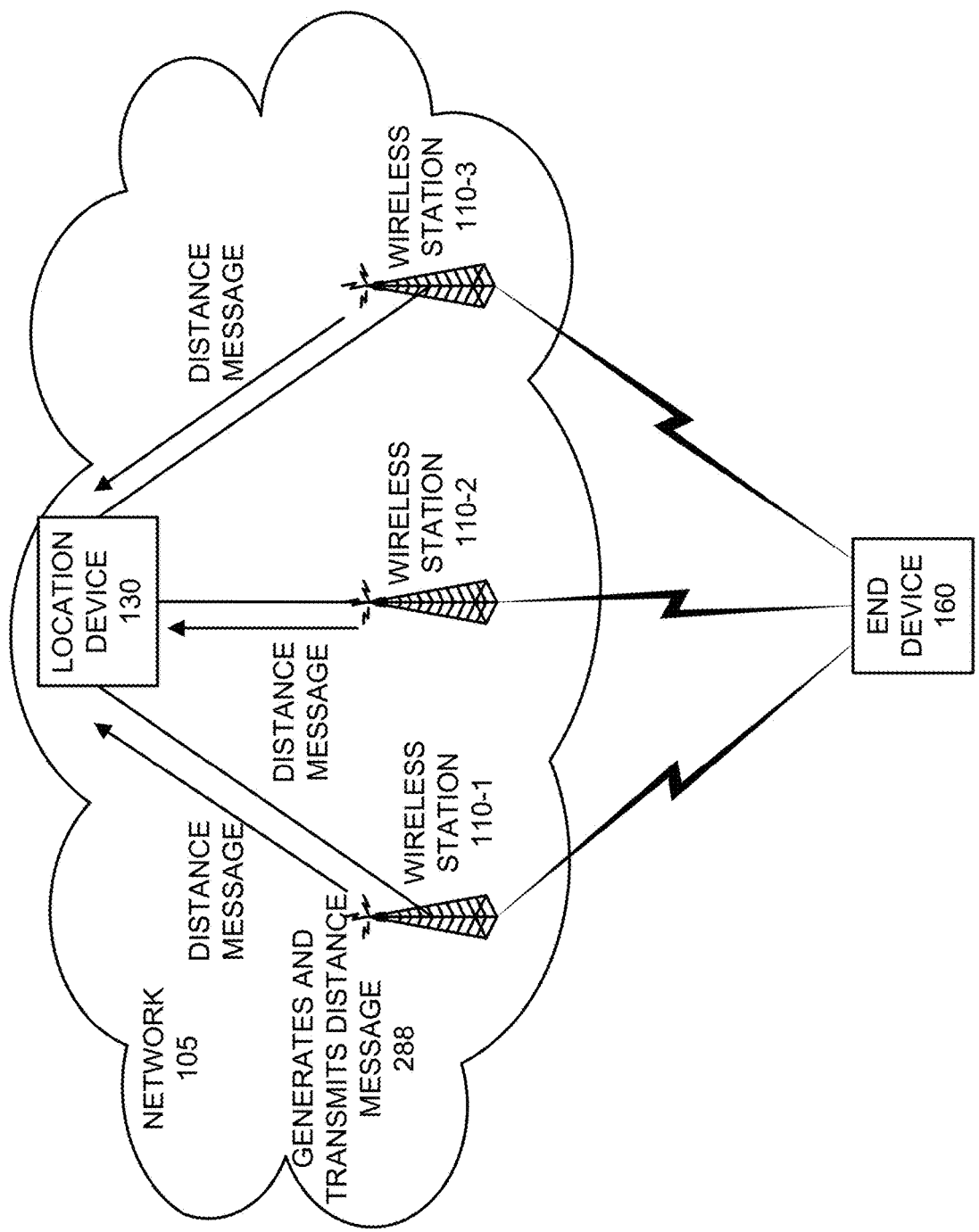

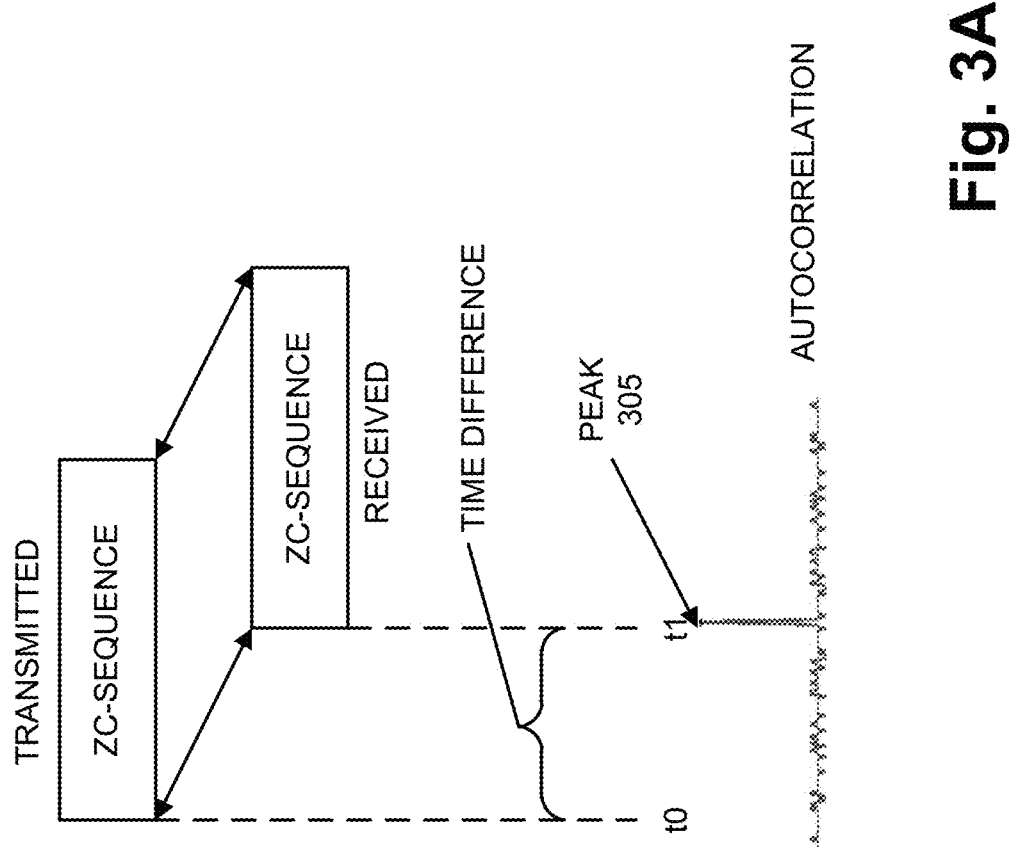

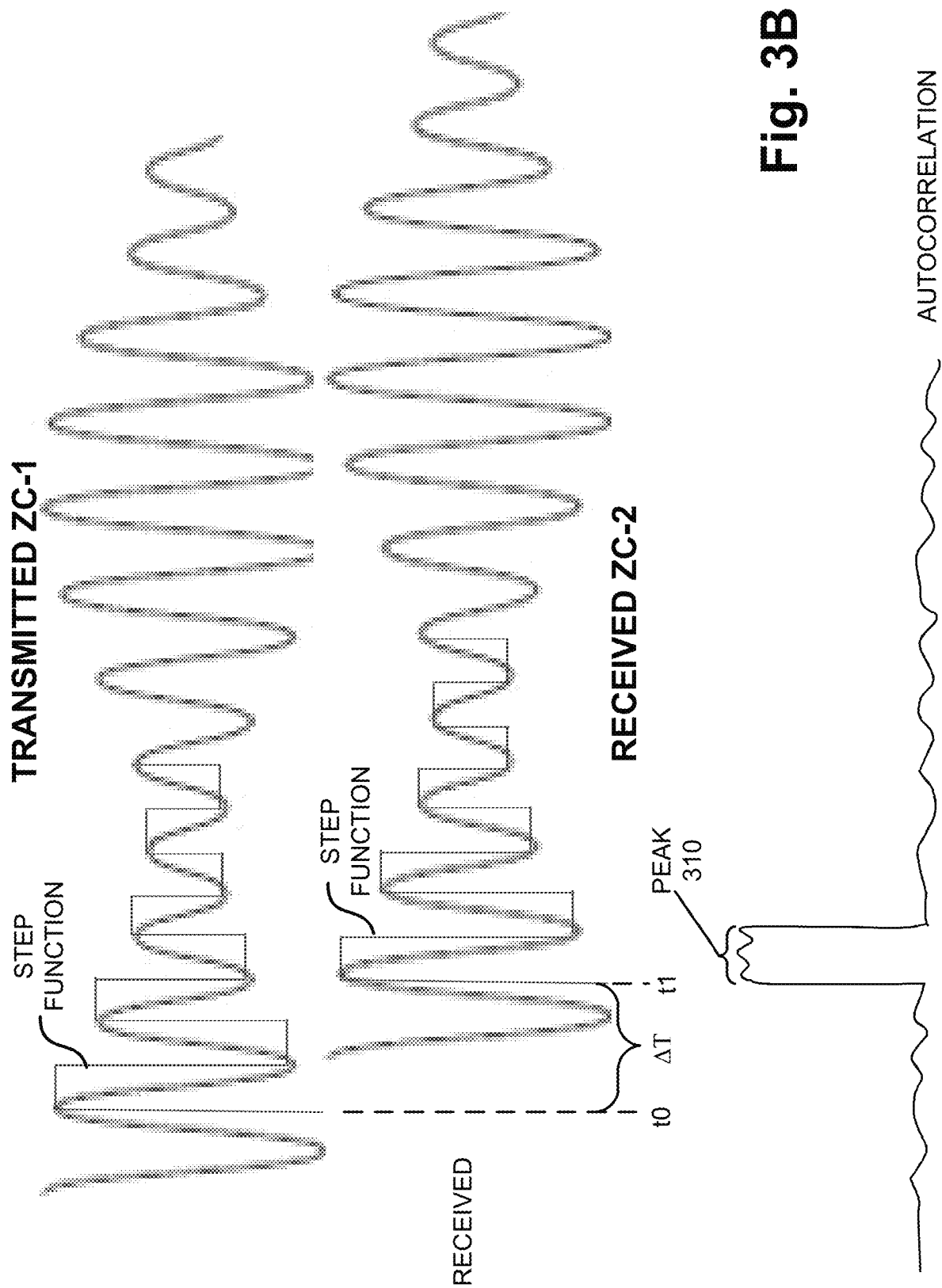

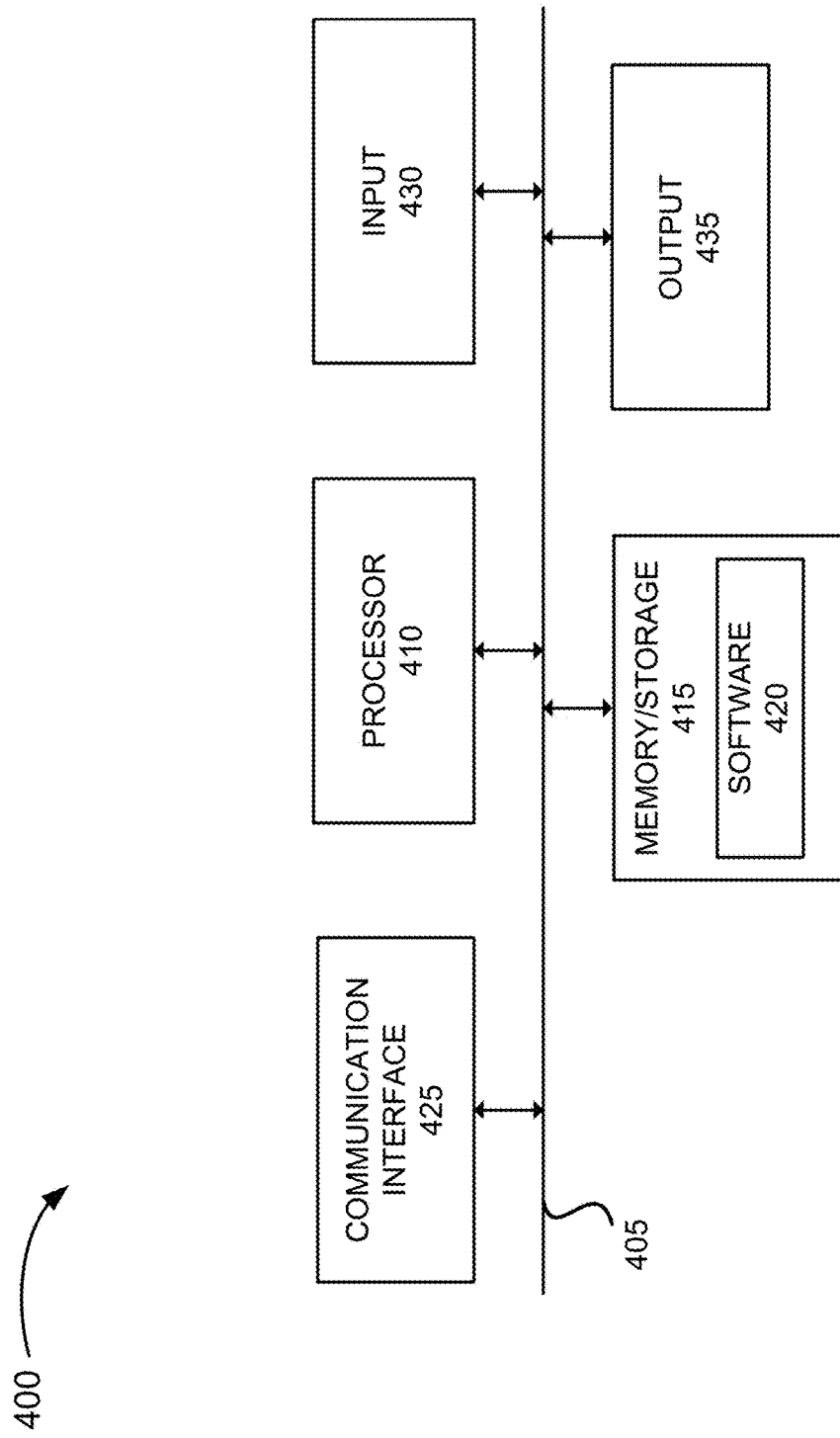

POSITIONING BASED ON PHASE AND TIME DIFFERENCES OF SIGNALS

BACKGROUND

Currently, various wireless geolocation techniques, such as Observed Time Difference of Arrival (OTDOA) and Uplink-Time Difference of Arrival (U-TDOA) may be used to determine the position of an end device. For example, OTDOA is a multilateration method in which an end device measures the time difference between downlink signals received from base stations, and reports the time differences to the network. The network uses the time differences and the positions of the base stations to calculate the position of the end device. U-TDOA is also a multilateration method. However, the position of the end device is calculated based on the time of arrival of an uplink signal sent from the end device to the base stations.

BRIEF DESCRIPTION OF THE DRAWINGS

FIGS. 2A-2L are diagrams illustrating an exemplary process of the positioning service;

FIG. 3A is a diagram illustrating an exemplary autocorrelation process that determines a time difference between position reference signals;

FIGS. 3B and 3C are diagrams illustrating an exemplary process that determines a phase difference between position reference signals;

FIG. 4 is a diagram illustrating exemplary components of a device that may correspond to one or more of the devices illustrated herein;

DETAILED DESCRIPTION OF PREFERRED EMBODIMENTS

Figure 1:
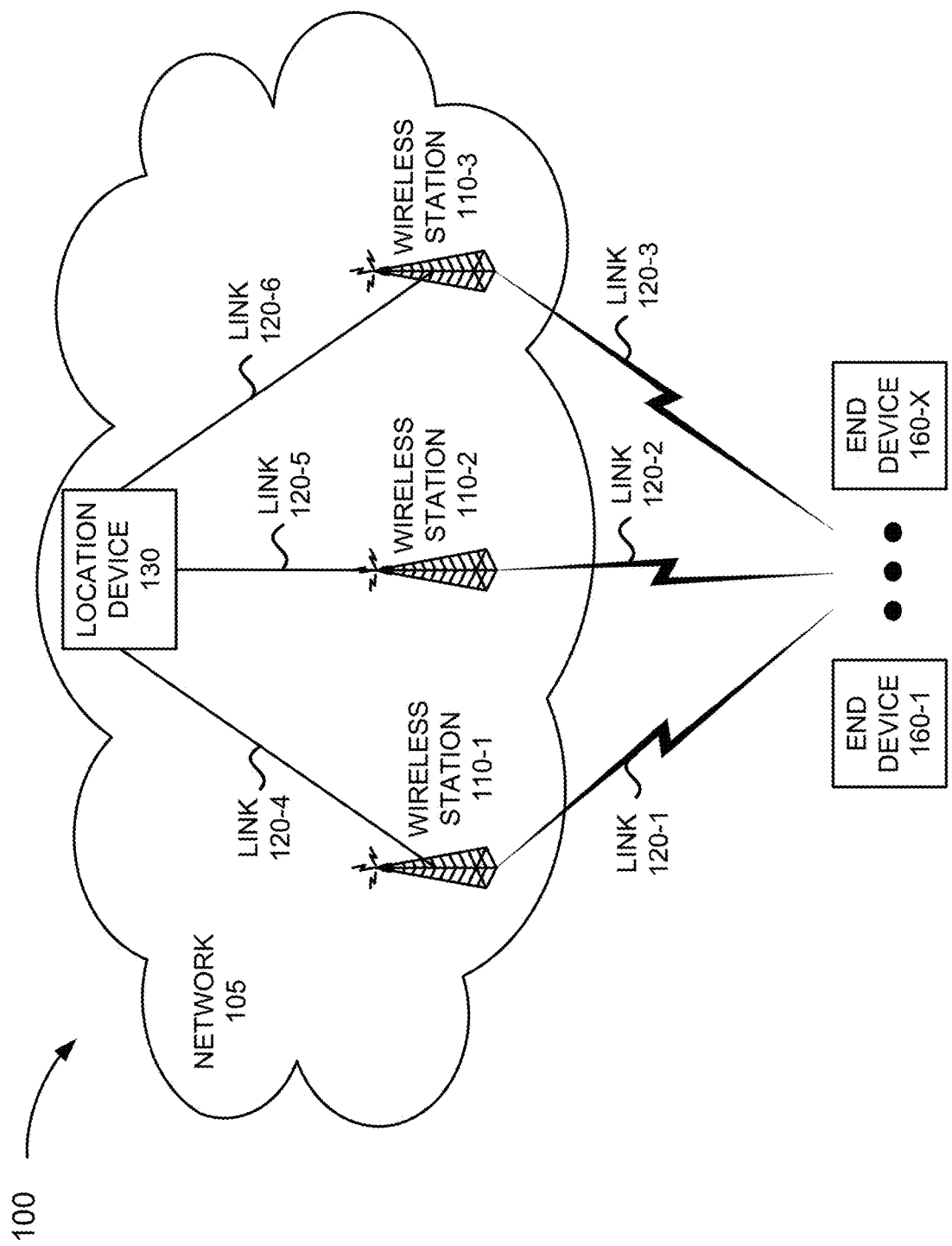
FIG. 1 is a diagram illustrating an exemplary environment in which an exemplary embodiment of a positioning service based on phase and time differences of signals may be implemented.

The following detailed description refers to the accompanying drawings. The same reference numbers in different drawings may identify the same or similar elements. Also, the following detailed description does not limit the invention.

Both OTDOA and U-TDOA depend on time difference of arrival measurements. According to the OTDOA method, the end device measures the time difference of arrival, which requires the end device to be configured to do so and can add to power consumption. Also, according to both the OTDOA and the U-TDOA methods, the accuracy of calculating the location of the end device may be compromised. For example, typically, the position of the end device is based on a correlation between a received signal strength indicator (RSSI) value and a distance. However, the RSSI value can change due to various environmental factors which, in turn, can negatively impact the accuracy of calculating the position of the end device.

According to an exemplary embodiment, a positioning service is described in which both a time difference and a phase difference of signals are used to calculate a position of an end device. According to an exemplary embodiment, a network device generates and transmits a signal to an end device. According to an exemplary implementation, the signal is a position reference signal that is used to determine the distance of end device from the network device, and the location of the end device. According to an exemplary implementation, the signal includes an identifier of the network device. According to an exemplary implementation, the signal is encoded using a perfect polyphase sequence. For example, the signal is encoded as a Zaduff-Chu (ZC) sequence.

According to an exemplary embodiment, the end device receives and decodes the signal. In response to decoding, the end device determines whether the identifier of the network device matches identifiers stored by the end device. When the end device determines that a match exists, the end device generates and transmits a modified signal back to the network device. According to an exemplary implementation, the modified signal includes the received signal and an identifier of the end device. According to an exemplary implementation, the modified signal is encoded using a perfect polyphase sequence. For example, the modified signal is encoded as a ZC sequence. According to an exemplary implementation, the end device includes an amplifier to invert the signal with a phase inversion.

According to an exemplary embodiment, the network device compares the transmitted signal with the received modified signal to determine phase and time differences. According to an exemplary embodiment, the network device inverts the phase of the modified signal due to the inversion created at the end device. The network device may also decode the end device identifier before performing autocorrelation. According to an exemplary embodiment, the network device performs autocorrelation between the two encoded sequences, which produces a correlation peak of the sequence within a first time window. Based on the correlation peak, a time difference between the transmitted signal and the received modified signal can be calculated. According to an exemplary embodiment, based on the position in time of the correlation peak, the network device reconstructs the wave forms within the first time window by matching code point values between the transmitted signal and the modified signal. Based on the matching of the code point values, the network device identifies corresponding peak code points between the transmitted and the modified signal within a second time window that is smaller than the first time window used to identify the correlation peak. The time difference between the corresponding peak code point values represents the phase difference. The calculated time difference may be used to determine distance using conventional methods. For example, the distance between the end device and the network device may be calculated based on multiplying the speed of light value with the calculated time difference, accounting for other known delays (e.g., end device processing time). The distance may be used to calculate the position of the end device using conventional methods. For example, the position of the end device may be calculated based on various algorithms, such as trilateration, multilateration, or other nonlinear equation-based approach.

In view of the foregoing, the positioning service may afford more accurate distance and location measurements relative to the end device.

FIG. 1 is a diagram illustrating an exemplary environment 100 in which an exemplary embodiment of a positioning service may be implemented. As illustrated, environment 100 includes intelligent a network 105. Network 105 includes wireless stations 110-1 through 110-3 (also referred to collectively as wireless stations 110 and, individually or generally as wireless station 110). Wireless network 105 further includes a location device 130. Environment 100 also includes end devices 160-1 through 160-X (also referred to collectively as end devices 160 and, individually and generally as end device 160), and communication links 120-1 through 120-6, (also referred to collectively as communication links 120 and, individually and generally as communication link 120).

The number of network devices, the number of networks, and the arrangement in environment 100 are exemplary. According to other embodiments, environment 100 may include additional network devices, fewer network devices, and/or differently arranged network devices, than those illustrated in FIG. 1. Additionally, or alternatively, environment 100 may include additional networks and/or arrangement that is/are different from that illustrated in FIG. 1. For example, end device 160 may be a device of a local area network (LAN). Additionally, or alternatively, environment 100 may include a core network, the Internet, the Web, an Internet Protocol Multimedia Subsystem (IMS) network, a Rich Communication Service (RCS) network, a cloud network, or other type of network that may provide an asset (e.g., multimedia, audio and/or video, etc.), an end user service, etc. Additionally, the number of communication links 120, the type of communication links 120 (e.g., wired, wireless, etc.), and the arrangement of communication links 120 illustrated in environment 100 are exemplary. For example, although not illustrated, communication links 120 may exist between wireless stations 110.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device). For example, location device 130 may be implemented according to various computing architectures and/or one or multiple network architectures.

A communicative connection between network devices (e.g., wireless station 110 and location device 130) and between end device 160 and network devices (e.g., wireless stations 110) may be direct or indirect via communication link 120. For example, an indirect communication connection may involve an intermediary device and/or an intermediary network not illustrated in FIG. 1. By way of further example, environment 100 may include a relay node (RN) or other type of wireless node (e.g., a home evolved Node B (HeNB), a donor eNB (DeNB), a remote radio head (RRH), a gateway, a pico node, a femto node, etc.). Additionally, or alternatively, environment 100 may include an intermediary network, such as a WiFi network, a Bluetooth network, or other type of capillary network.

Network 105 includes one or multiple networks of one or multiple types. For example, network 105 includes a wireless network. By way of further example, network 105 may be implemented to include a metropolitan area network (MAN), a wide area network (WAN), or other type of terrestrial network, such as an ad hoc network, a public network, or a private network. Network 105 may be implemented to include a mobile network, a Fourth Generation (4G) network, a Third Generation (3G) network, or a network of a currently developing or future technology, framework, specification, architecture, and/or platform. Network 105 may include a wired network. By way of further example, network 105 may be implemented to include an optical network, a T-carrier network, or other type of cable network.

Wireless station 110 includes a network device that has computational and wireless communicative capabilities. Wireless station 110 may be implemented to include a radio remote unit (RRU). Alternatively, wireless station 110 may be implemented to include a radio remote unit and a baseband unit (BBU). By way of further example, wireless station 110 may be implemented to include a base station, a Node B, a base transceiver station (BTS), an evolved Node B (eNB), or other type of wireless node.

According to an exemplary embodiment, wireless station 110 includes logic that provides a positioning service. According to an exemplary embodiment, the positioning service generates and transmits a signal to end device 160 that is used to calculate distance between wireless station 110 and end device 160. The signal may be implemented as a reference signal. The format of the signal may be implemented as a burst signal. For example, the signal may include a cell identifier-encoded ZC sequence that repeats the cell identifier multiple times.

According to an exemplary embodiment, the positioning service coordinates the transmission of the signal among wireless stations 110 based on a schedule. According to an exemplary embodiment, the positioning service provides an identifier of end device 160 to one or multiple other wireless stations 110. According to one example, the identifier of end device 160 may be implemented as a Radio Network Temporary Identifier (RNTI) (e.g., a Cell-RNTI (C-RNTI), etc.). According to another example, the identifier of end device 160 may be implemented as a combination of the RNTI and the identifier of wireless station 110.

According to an exemplary embodiment, the positioning service receives a modified signal from end device 160 that is responsive to the transmitted signal. The modified signal may be implemented as a reference signal. The format of the modified signal may be implemented as a burst signal. According to an exemplary implementation, the modified signal includes the signal and an identifier of the end device. For example, the modified signal may include a cell identifier and end device identifier-encoded ZC sequence that repeats the cell identifier and the end device identifier multiple times.

According to an exemplary embodiment, the positioning service calculates time and phase differences between the transmitted signal to end device 160 and the modified signal received from end device 160. According to an exemplary embodiment, the positioning service inverts the phase of the modified signal. The positioning service may decode the end device identifier before performing autocorrelation. According to an exemplary embodiment, the positioning service performs autocorrelation between the encoded sequences of the cell identifier, which produces a correlation peak of the sequence points within a first time window. Based on the position of the correlation peak, a time difference between the transmitted signal and the modified signal can be calculated. According to an exemplary embodiment, based on the position in time of the correlation peak, the positioning service reconstructs the waveforms within the first time window by matching interpolated code point values between the transmitted signal and the modified signal. Based on the matching of the interpolated code point values, the positioning service identifies corresponding peak code points between the transmitted and the modified signal within a second time window that is smaller than the first time window used to identify the correlation peak. The time difference between the corresponding peak code point values represents the phase difference.

According to an exemplary embodiment, the positioning service calculates a distance between wireless station 110 and end device 160 based on the calculated time difference. The positioning service transmits a message, which includes the distance, the identifier of end device 160, and a timestamp, to location server 130. According to other exemplary embodiments, the positioning service transmits a message, which includes the calculated time difference(s), the identifier of end device 160, and a timestamp, to location server 130.

Communication link 120 provides a communication path between devices. For example, communication link 120 provides a communication path between end device 160 and wireless station 110, and between wireless station 110 and location 130. Communication link 120 may have certain characteristics, such as, for example, bandwidth capacity and data rate. Communication link 120 may be implemented to include one or multiple mediums, such as wireless (e.g., radio, microwave, terrestrial, satellite, infrared, etc.) and/or wired (e.g., coaxial cable, optical fiber, copper, etc.).

Location device 130 includes a device that has computational and communication capabilities. Location device 130 may be implemented as a server device, a Web device, or other type of network computer.

According to an exemplary embodiment, location device 130 includes logic that provides a positioning service. According to an exemplary embodiment, the positioning service receives calculated distances, end device identifiers, and timestamps from wireless stations 110. The positioning service calculates a location of end device 160 based on the calculated distances from each wireless station 110. According to an exemplary implementation, the positioning service uses an algorithm (e.g., a trilateration algorithm, a multilateration algorithm, or the like) and the distances to calculate the position of end device 160.

According to other exemplary embodiments, the positioning service receives calculated time differences, end device identifiers, and timestamps from wireless stations 110. The positioning service calculates distances relative to each wireless station 110 based on the time differences. The positioning service may then calculate the position of end device 160 based on the calculated distances.

According to an exemplary embodiment, the positioning service manages a database that stores the calculated locations, end device identifiers, and time stamps pertaining to end devices 160. According to an exemplary embodiment, the positioning service accepts queries from other devices regarding the location of end device 160. The positioning service responds to the queries based on the location information stored in the database.

End device 160 includes a device that has computational and wireless communication capabilities. End device 160 may be implemented as a mobile device or a portable device. End device 160 may be implemented as a machine-type communication (MTC) device, an Internet of Things (IoT) device, a machine-to-machine (M2M) device, or an end user device. For example, the end user device may be implemented as a smartphone, a personal digital assistant, a tablet, a laptop, a netbook, a phablet, a wearable device, an infotainment system in a vehicle, a game system, a music playing system, or some other type of wireless device (e.g., a navigation device, etc.).

According to an exemplary embodiment, end device 160 includes logic that provides a positioning service. According to an exemplary embodiment, the positioning service receives a signal from wireless station 110 that is used to calculate a distance between wireless station 110 and end device 160. As previously described, according to an exemplary implementation, the signal may be implemented as a burst signal that includes a cell id-encoded ZC sequence pertaining to wireless station 110.

According to an exemplary embodiment, the positioning service generates and transmits a modified signal, which is responsive to the received signal, back to wireless station 110. As previously described, according to an exemplary implementation, the modified signal includes the received signal and an identifier of end device 160. For example, the modified signal may include a cell identifier and end device identifier-encoded ZC sequence that repeats the cell identifier and the end device identifier multiple times. According to another exemplary implementation, the modified signal includes a ZC sequence carrying the cell identifier, the end device identifier, and data indicating a time period that transpired between when end device 160 received the signal from wireless station 110 and when end device 160 transmitted the modified signal. By way of example, timestamps may be used.

Typically, in an LTE environment, the location of user equipment (UE) is estimated by correlating an RSSI value with a distance. The accuracy of such an approach is approximately 200 meters because the RSSI value can change due to various environmental factors, such as, for example, humidity, building obstruction, noises, and multipath channel effect. However, as described herein, the positioning service may achieve higher accuracy relative to existing techniques while concurrently minimizing changes in hardware (e.g., at end device 160).

FIGS. 2A-2L are diagrams illustrating an exemplary process of the positioning service according to an exemplary scenario. For example, the process is explained in relation to an LTE environment. By way of further example, wireless stations 110 may be of an Evolved UMTS Terrestrial Radio Access Network (E-UTRAN) included in an LTE network or an LTE-Advanced (LTE-A) network.

According to other exemplary implementations, wireless stations 110 may be a part of another type of access network (e.g., a radio access network (RAN)), such as a legacy access network (e.g., a Third Generation (3G) RAN, a 3.5G RAN) or a future generation RAN (e.g., a Fifth Generation (5G RAN), etc.). By way of further example, the access network may be implemented as a U-TRAN, a Universal Mobile Telecommunications System (UMTS) RAN, a Global System for Mobile Communications (GSM) RAN, a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, a public land mobile network (PLMN), etc.), or a network generation RAN (e.g., an intelligent wireless mesh network (IWMN) that provides fronthaul connectivity, a virtual RAN (vRAN), a software-defined network (SDN), network functions virtualization (NFV) network, or other future generation access network).

Figure 2A:
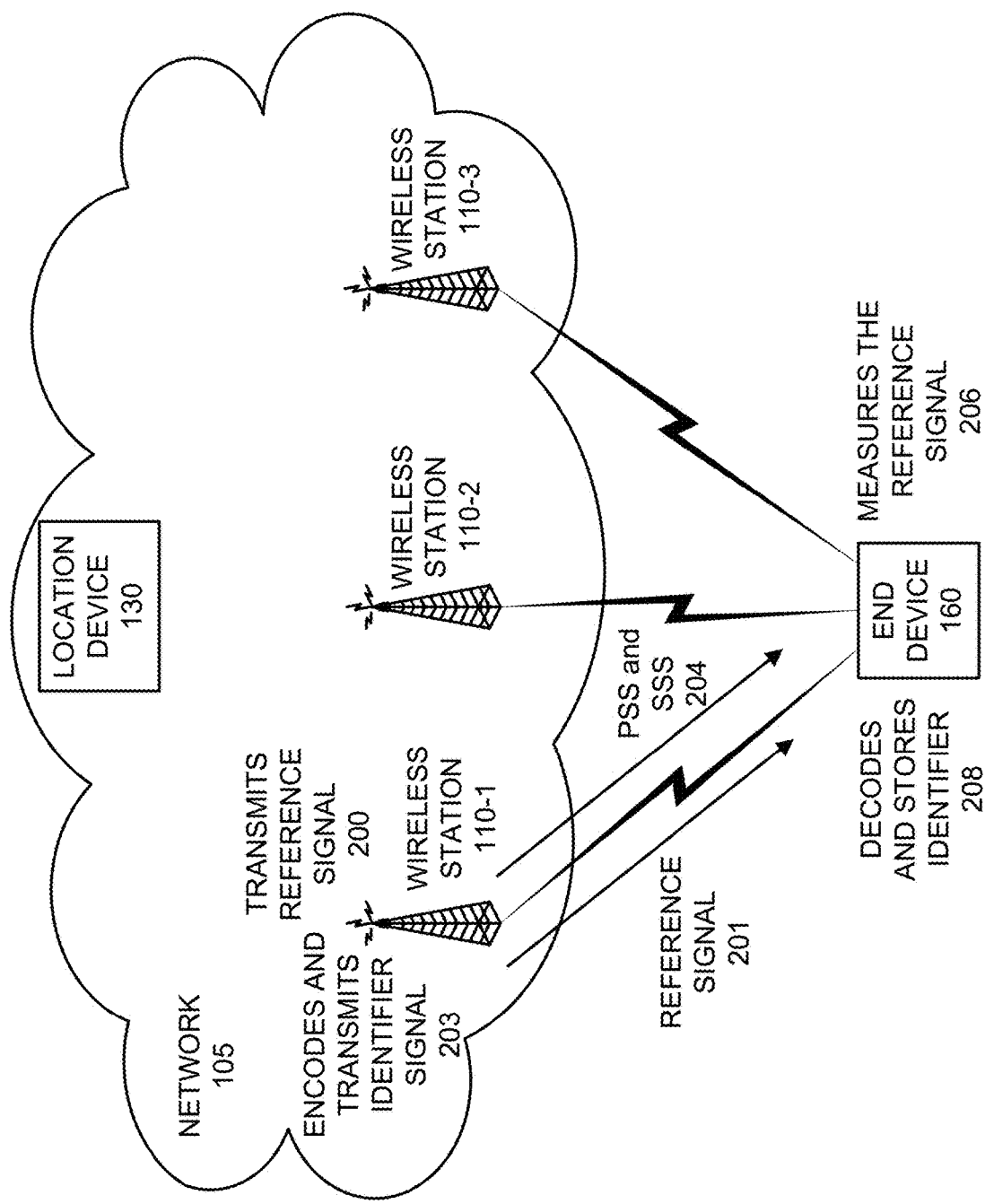

Referring to FIG. 2A, wireless station 110-1 may transmit a reference signal 200. For example, the reference signal may be a cell-specific reference signal (CRS) or a pilot signal that is broadcasted by wireless station 110-1. Based on the transmission, a reference signal 201 may be received by end device 160. Additionally, wireless station 110-1 may encode and transmit an identifier signal 203. For example, the identifier signal may be a PSS and an SSS that are ZC-encoded and broadcasted by wireless station 110-1. According to various implementations in the LTE environment, there may be 504 different cell identifications (i.e., physical cell identities (PCIs)) that include 168 cell-identification groups in which each cell identification group has 3 identities. The PSS may identify 1 of 3 physical layer cell identities, and the SSS may identify 1 of 168 cell layer identity groups.

Based on the transmission, a PSS and SSS 204 may be received by end device 160. For example, during a search or a scan for candidate cells on which to camp, end device 160 may receive the PSS and the SSS. According to some implementations, the selection and/or order of the candidate cells the end device 160 searches and/or scans may be based on a list. For example, the list of candidate cells may be a most recently used (MRU) list, a public land mobile network (PLMN) list, a preferred roaming list (PRL), and so forth. The candidate cells may operate on different bands and/or carrier frequencies.

As further illustrated, in response to receiving reference signal 201, end device 160 measures the reference signal 206. For example, end device 160 may measure a Reference Signal Receive Power (RSRP) and/or a Received Signal Strength Indicator (RSSI). End device 160 may calculate a Reference Signal Received Quality (RSRQ) based on the RSRP and the RSSI. Also, in response to receiving PSS and SSS 204, end device 160 decodes and stores an identifier 208 of wireless station 110-1. For example, end device 160 decodes the PSS and the SSS and obtains the PCI of wireless station 110-1.

Figure 2B:
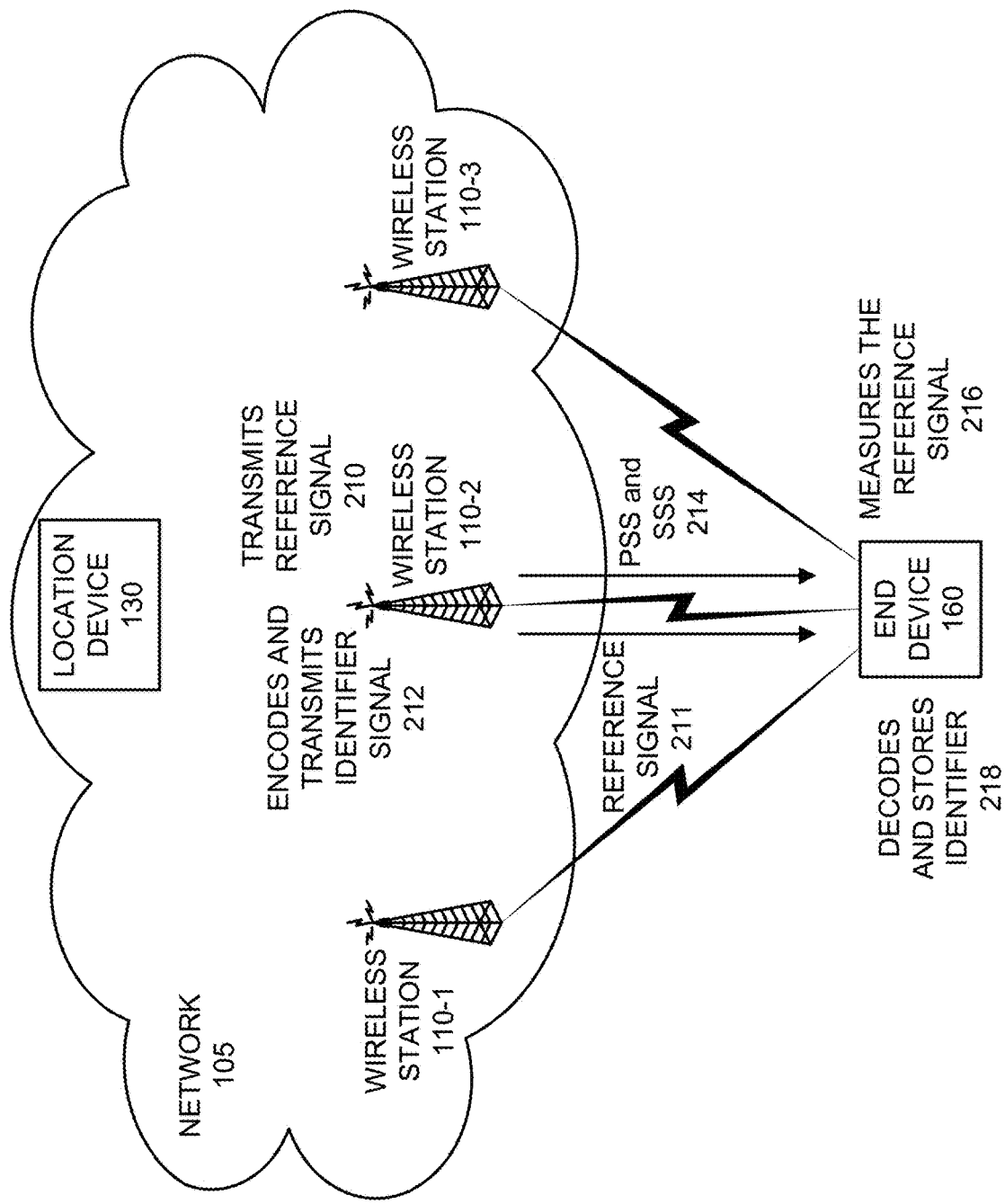
Figure 2C:
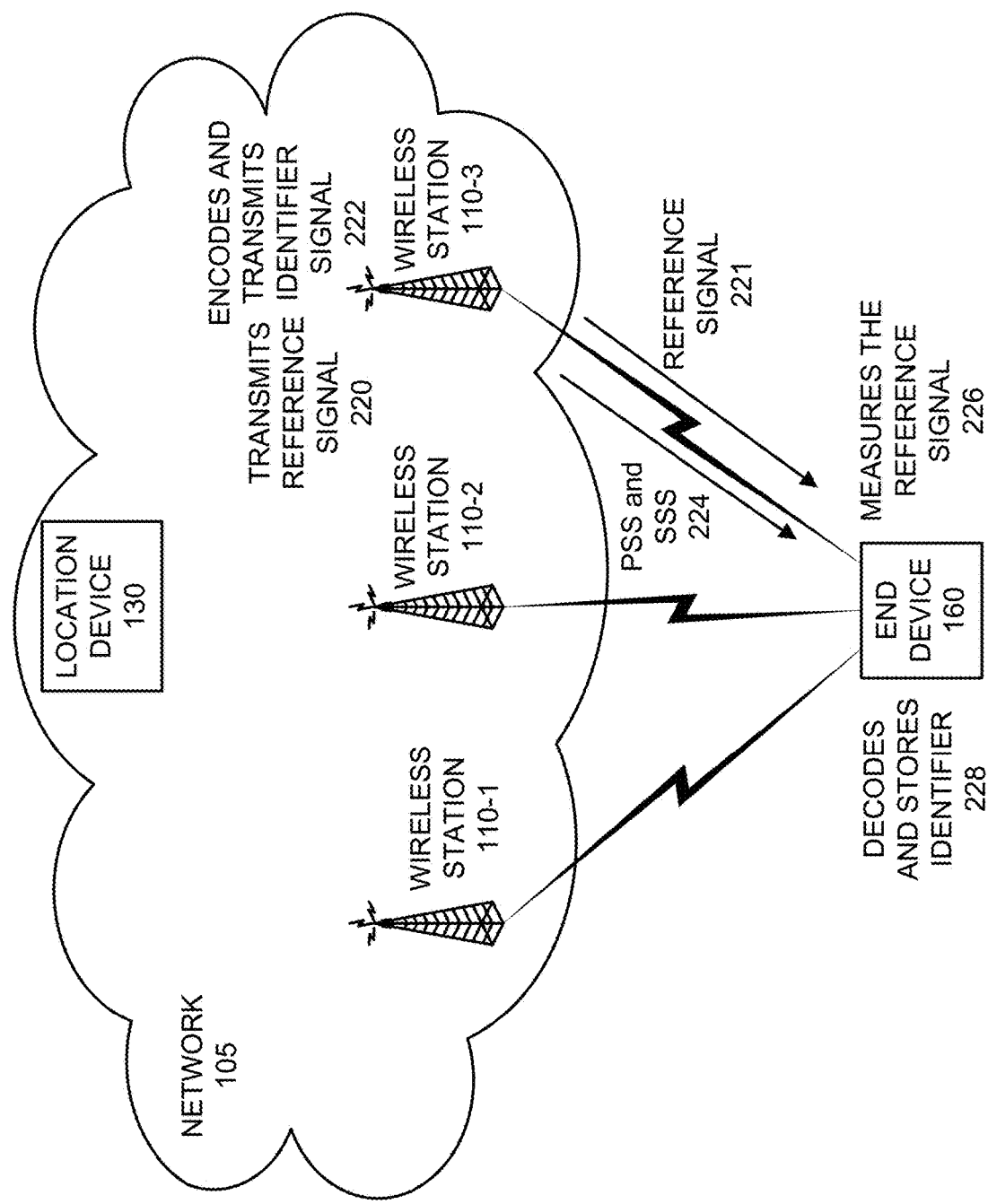

Referring to FIGS. 2B and 2C, wireless stations 110-2 and 110-3 may perform operations similar to the operations performed by wireless station 110-1 in relation to FIG. 2A. For example, wireless station 110-2 transmits a reference signal 210, and encodes and transmits an identifier signal 212. The reference signal 211 and PSS and SSS 214 may be received by end device 160. Additionally, for example, wireless station 110-3 transmits a reference signal 220, and encodes and transmits an identifier signal 222. The reference signal 221 and PSS and SSS 224 may be received by end device 160. Also, end device 160 may perform operations similar to those previously described in FIG. 2A. For example, in FIG. 2B, end device 160 measures the reference signal 216, and decodes and stores the identifier 218 of wireless station 110-2. Additionally, for example, in FIG. 2C, end device 160 measures the reference signal 226, and decodes and stores the identifier 228 of wireless station 110-3.

Figure 2D:
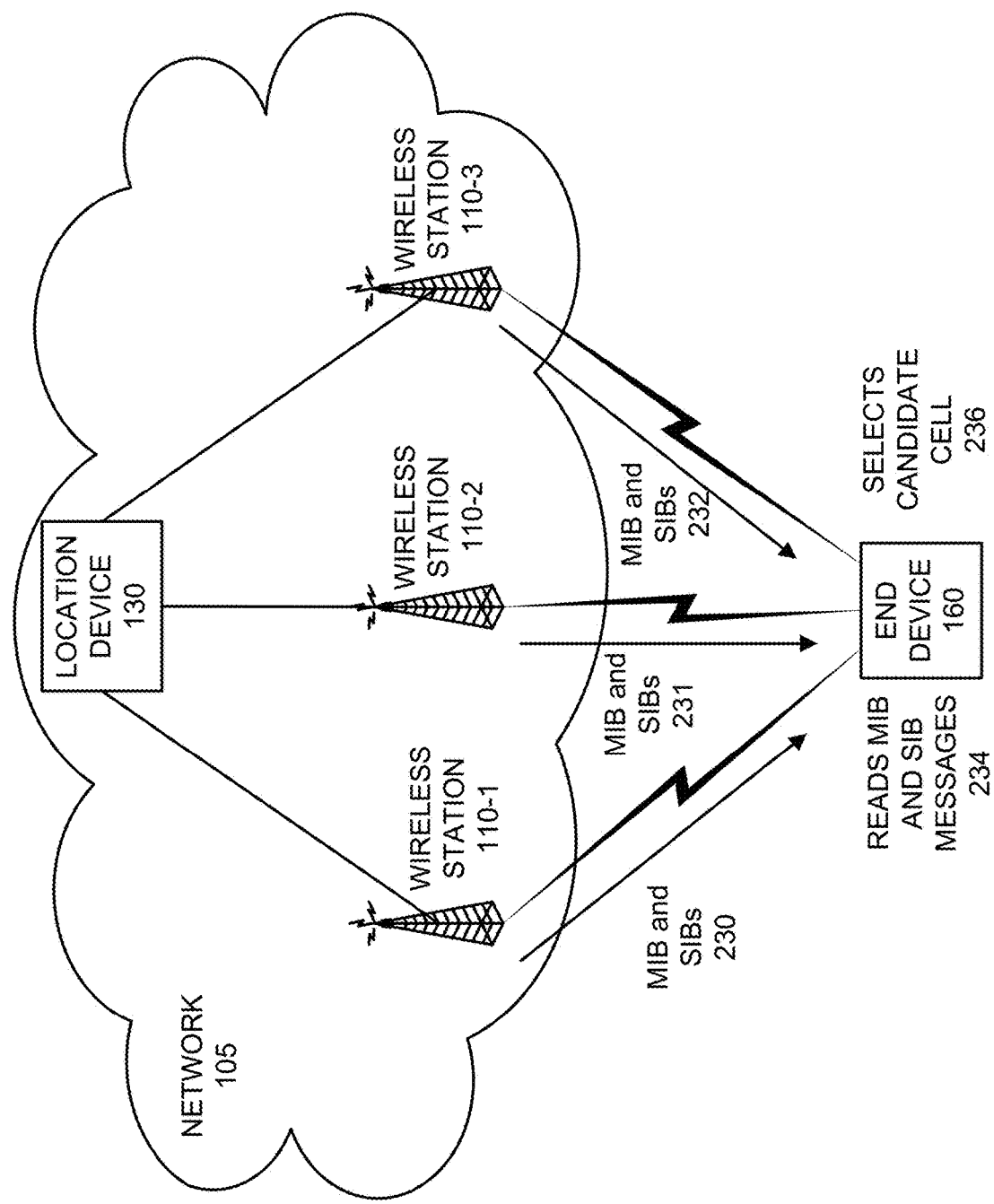

Referring to FIG. 2D, end device 160 may also receive a Master Information Block (MIB) and System Information Blocks (SIBs) (e.g., MIB and SIBs) 230, MIB and SIBs 231, and MIB and SIBs 232) from wireless stations 110. End device 160 may read the MIB and SIB messages 234. As further illustrated, end device 160 selects a candidate cell 236 on which to camp based on cell selection criteria. For example, the cell section criteria may be based on evaluating the measurement values of the reference signals (e.g., relative to each wireless station 110, a threshold (e.g., a cell selection criterion S (e.g., Srxlev), etc.), evaluating lists (e.g., an MRU list, etc.), evaluating MIB and SIB messages, and/or other types of criteria. According to this example, assume end device 160 select wireless station 110-1 on which to camp.

Figure 2E:
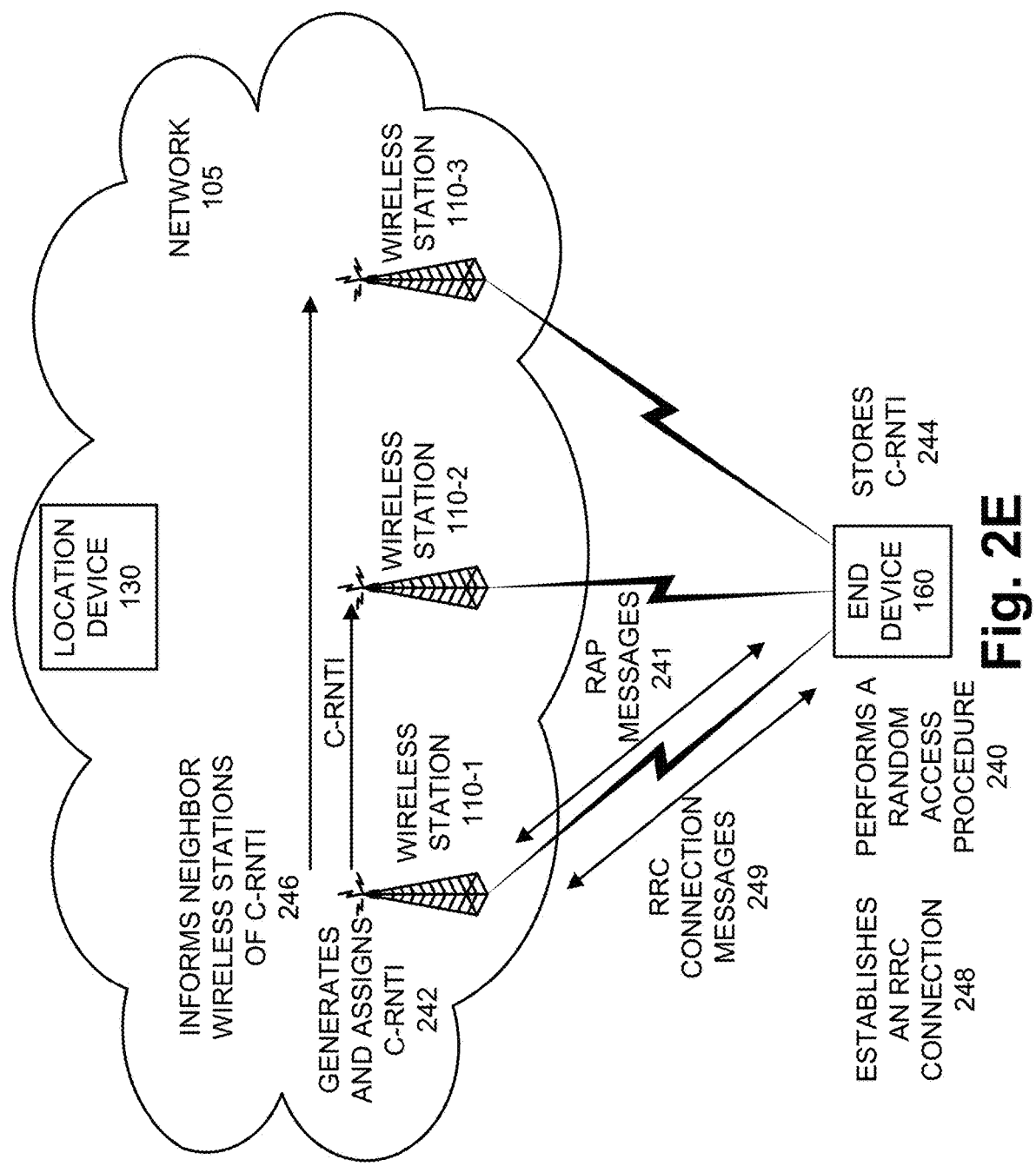

Referring to FIG. 2E, end device 160 performs a random access procedure (RAP) 240 with wireless station 110-1. For example, the random access procedure may be a non-contention-based RAP in which end device 160 and wireless station 110-1 exchange RAP messages 241 in accordance with an LTE or an LTE-A random access procedure. During this procedure, wireless station 110-1 assigns a C-RNTI 242 to end device 160. Wireless station 110-1 generates and transmits a RAP message (e.g., in a RA response) that carries the C-RNTI and is received by end device 160. As illustrated, in response to receiving the RAP message, end device 160 stores the C-RNTI 244.

As further illustrated in FIG. 2E, unlike a typical RAP procedure, in response to assigning the C-RNTI to end device 160, wireless station 110-1 informs neighbor wireless stations 110 about the C-RNTI 246. For example, wireless station 110-1 may communicate the C-RNTI to wireless station 110-2 and wireless station 110-3. Alternatively, wireless station 110-1 may communicate the C-RNTI to wireless station 110-2 or wireless station 110-3, and the message carrying the C-RNTI may be forwarded to another wireless station 110. The number of wireless stations 110 and/or the particular wireless stations 110 that are informed may be a network configuration parameter. Although not illustrated, wireless stations 110-2 and 110-3 may store the C-RNTI.

Subsequent to a successful random access procedure, end device 160 establishes a radio resource connection (RRC) 248 with wireless station 110-1. For example, end device 160 and wireless station 110-1 exchange RRC connection messages 249 in accordance with an LTE or an LTE-A radio resource connection establishment procedure.

Figure 2F:
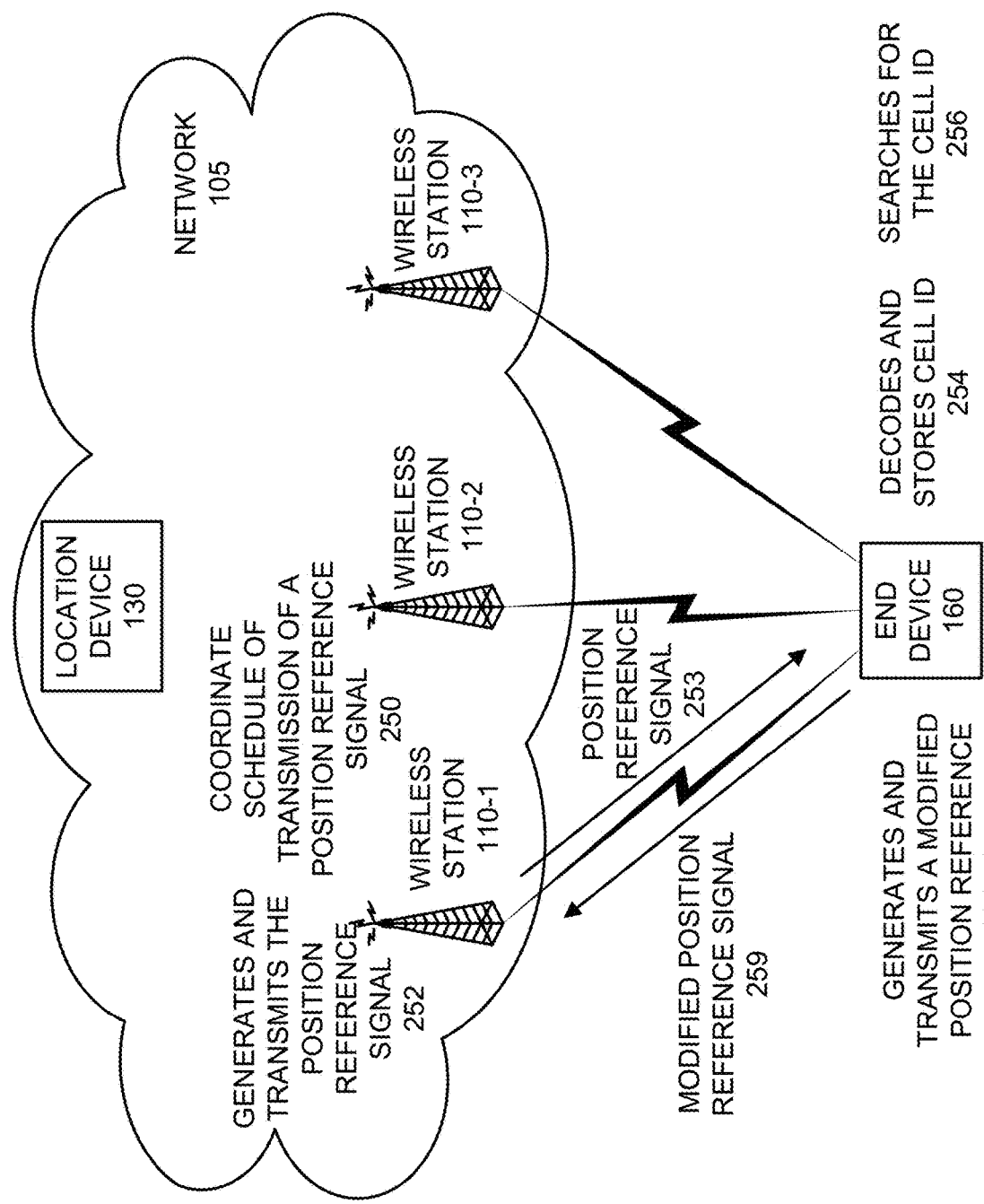

Referring to FIG. 2F, wireless stations 110 coordinate the scheduling of respective transmissions of a position reference signal 250. The position reference signal is used to determine the distance of end device 160 from wireless station 110, as described herein. Subsequent to scheduling, as illustrated and according to this exemplary scenario, wireless station 110-1 generates and transmits the position reference signal 252. According to an exemplary embodiment, the format of the position reference signal includes an identifier of wireless station 110. For example, the identifier may be implemented as the cell identifier. According an exemplary implementation, the position reference signal includes a ZC sequence-encoding of the cell identifier. Given the properties of ZC sequences in general, the ZC sequence has a constant amplitude, a constant magnitude cross-correlation across all lags, and a zero auto-correlation for lags not equal to zero. According to an exemplary implementation, the ZC sequence may repeat the cell identifier multiple times. By way of further example, the ZC sequence may repeat the cell identifier up to about 10 times or some other number of repetitions that achieves a desirable signal-to-noise ratio and/or is allowable given the assigned time window to transmit.

According to other exemplary implementations, the identifier may be encoded using a different coding scheme (e.g., another perfect polyphase sequence) and/or other techniques may be used to achieve the desirable signal-to-noise ratio.

According to an exemplary implementation, the position reference signal may be transmitted by wireless station 110 within a radio frame. For example, the radio frame may be divided into 20×50 ms sub-frames and wireless stations 110 may schedule the transmission of the position reference signal within the 20 sub-frames. When wireless station 110 is assigned to a sub-frame, wireless station 110 transmits the position reference signal at the start of the assigned sub-frame. According to an exemplary implementation, wireless station 110 broadcasts the position reference signal within the cell it serves. According to other exemplary implementations, wireless station 110 may multicast or unicast the position reference signal to a group of end devices 160 or a single end device 160. In this regard, although a single end device 160 is illustrated, the position reference signal 253 may be received by multiple end devices 160 situated within a cell that is served by wireless station 110.

When end device 160 receives position reference signal 253, end device 160 decodes the position reference signal to produce the cell identifier, and stores the cell identifier 254. In response to storing the cell identifier, end device 160 searches for the cell identifier 256 relative to cell identifiers previously stored by end device 160 (e.g., during a cell search process). According to this exemplary scenario, assume that end device 160 finds a match between the cell identifier included in the position reference signal and previously stored cell identifiers.

In response to determining that a match exists, end device 160 generates and transmits a modified position reference signal 258. According to an exemplary implementation, the format of the modified position reference signal includes the matched identifier of wireless station 110 and an identifier of end device 160. For example, the identifier of wireless station 110 may be implemented as the cell identifier. Additionally, for the example, the identifier of end device 160 may be implemented as the C-RNTI. According an exemplary implementation, the modified position reference signal includes a ZC sequence-encoding of the C-RNTI and the cell identifier. According to an exemplary implementation, the ZC sequence may repeat the C-RNTI and the cell identifier multiple times. By way of further example, the ZC sequence may repeat the C-RNTI up to about 5 times or some other number of repetitions that achieves a desirable signal-to-noise ratio and/or is allowable given the assigned time window to transmit. The ZC sequence may repeat the cell identifier the same number of times as that included in the received position reference signal 253 or some other number of repetitions that is desirable and/or allowable, as previously mentioned.

According to other exemplary implementations, the identifier may be encoded using a different coding scheme (e.g., another perfect polyphase sequence) and/or other techniques may be used to achieve the desirable signal-to-noise ratio. Also, according to other exemplary implementations, the modified position reference signal may also carry data indicating a delay period occurring at end device 160, which represents the time period to receive, process, and transmit the modified position reference signal. Additionally, according to an exemplary implementation, end device 160 includes an amplifier that allows the end device 160 to transmit the modified position reference signal with only one phase inversion.

Subsequent to transmission of the position reference signal, wireless station 110 is configured to listen for a modified position reference signal. According to an exemplary implementation, wireless station 110 is configured to listen for the modified position reference signal during the same assigned sub-frame used for transmission. That is, wireless station 110 may transmit the position reference signal, and listen and receive the modified position reference signal within one sub-frame. According to other exemplary implementations, wireless station 110 may be assigned multiple sub-frames or some other type of time window to transmit the position reference signal and receive the modified position reference signal.

Referring to FIGS. 2G and 2H, wireless stations 110-2 and 110-3 may perform operations similar to the operations performed by wireless station 110-1 in relation to FIG. 2F. For example, in FIG. 2G, wireless station 110-2 generates and transmits the position reference signal 260 to end device 160, and receives a modified position reference signal 268 from end device 160. In response to receiving the position reference signal 261, end device 160 decodes and stores the cell identifier 263, and searches for the cell identifier 265 among previously stored cell identifiers. Upon finding a match, end device 160 generates and transmits a modified position reference signal 267 to wireless station 110-2. In FIG. 2H, wireless station 110-3 generates and transmits the position reference signal 270 to end device 160, and receives a modified position reference signal 278 from end device 160. In response to receiving the position reference signal 271, end device 160 decodes and stores the cell identifier 273, and searches for the cell identifier 275 among previously stored cell identifiers. Upon finding a match, end device 160 generates and transmits a modified position reference signal 277 to wireless station 110-3.

Figure 2I:
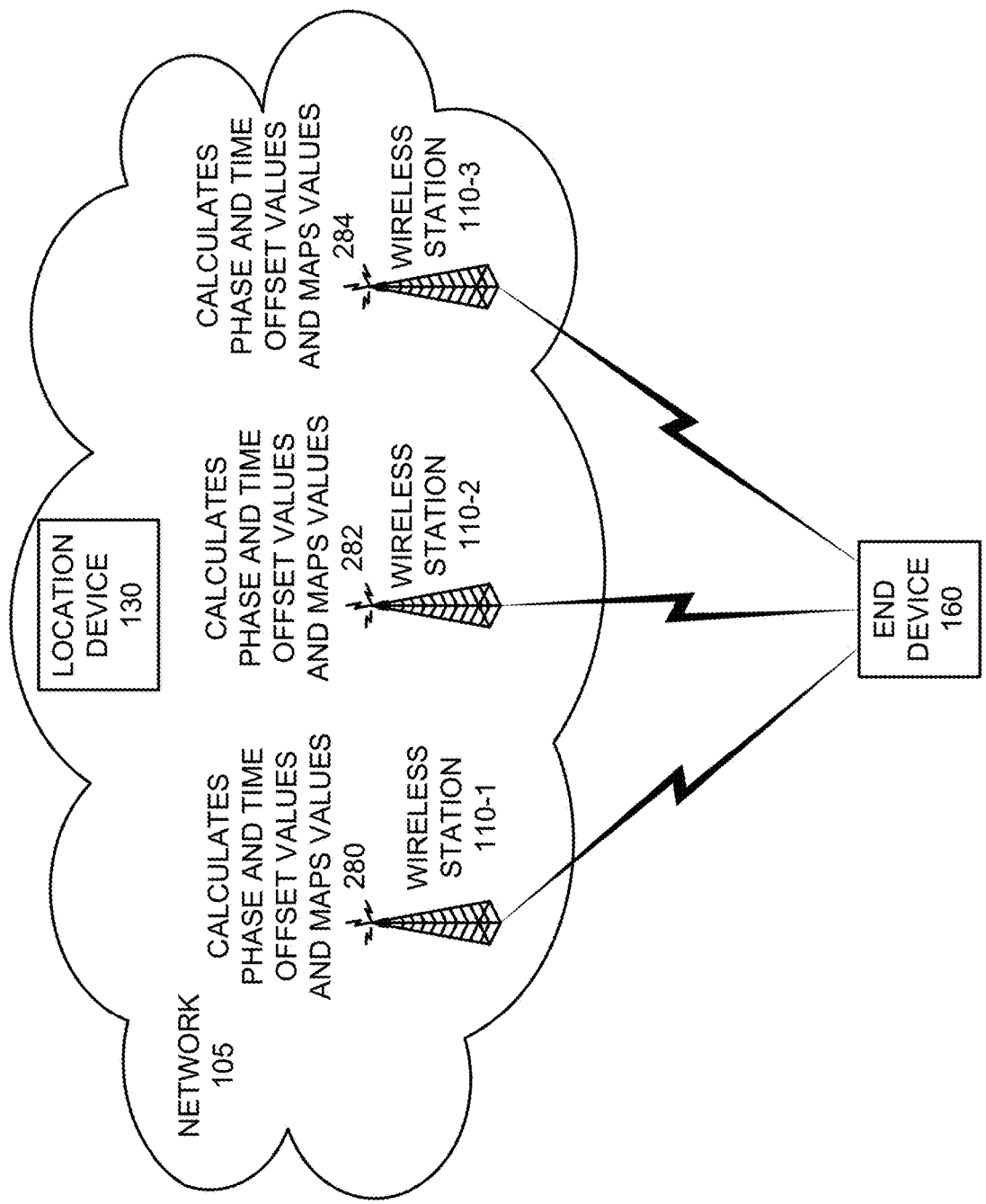

Referring to FIG. 2I, in response to receiving the modified position reference signals, each wireless station 110 calculates phase and time offset values, and maps these values 280, 282, and 284 to end device 160. Each wireless station 110 may invert the modified position reference signal due to the inversion created at end device 160. Additionally, each wireless station 110 may decode and/or remove a portion of the signal that is uncommon between the transmitted position reference signal and the modified position reference signal before performing autocorrelation. For example, wireless station 110 may decode and/or remove the end device identifier.

Referring to FIG. 3A, wireless station 110 performs autocorrelation between the transmitted and received position reference signals. For example, a peak detector of wireless station 110 searches for a peak output from a correlator of the ZC sequences occurring within a first time window. When two ZC sequences are generated from the same root sequences, a peak (sometimes referred to as a "correlation peak") can be detected in a certain position after the correlation calculation. Wireless station 110 may be configured to perform sliding window searches to detect the correlation peak. As illustrated, the position of a peak 305 indicates a time difference or time offset between the transmitted and received position reference signals. By way of further example, referring to FIG. 3B, assume that each ZC sequence is transmitted as a step function. As a result of the autocorrelation, a correlation peak 310 is detected. The correlation peak 310 may have a duration corresponding to the time period of the width of the pulse. For example, assume that the ZC sequence is transmitted as a 1 MHz signal, in which the pulse width is 1 microsecond in duration.

Figure 3C:
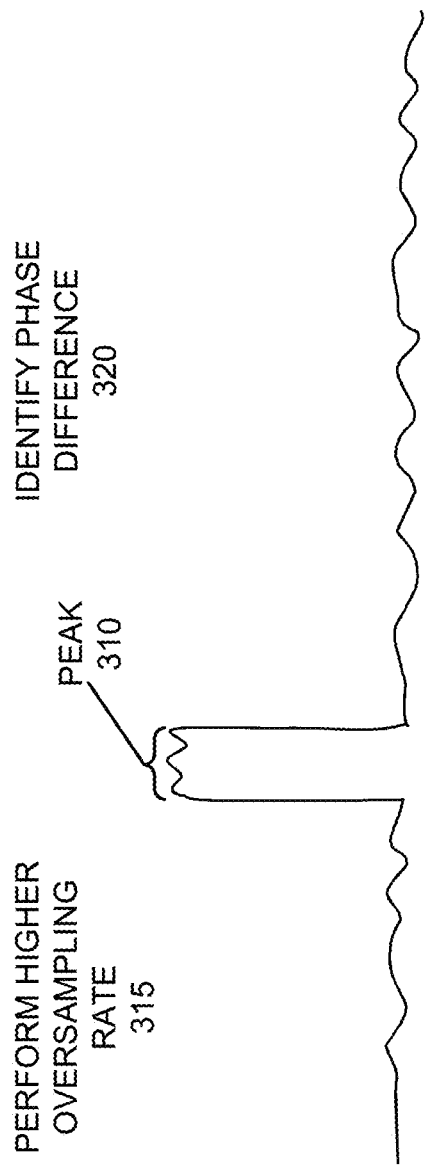

Referring to FIG. 3C, according to an exemplary embodiment, based on the time period of the correlation peak, wireless station 110 includes logic that samples 315 the correlation peak data of the reference signal at a rate higher than 1 MHz. For example, wireless station 110 may sample the correlation peak data at about 5 MHz or a higher or lower sampling rate. In this way, wireless station 110 may identify the occurrence of a peak or a value with a finer time granularity. For example, the onset of the correlation peak, the end of the correlation peak, and/or the signature of values between the onset and the end of the correlation peak may be determined. Based on the sampling of data, wireless station 110 may calculate the phase difference 320 and corresponding time difference(s) so as to yield a more accurate time difference.

Figure 3D:
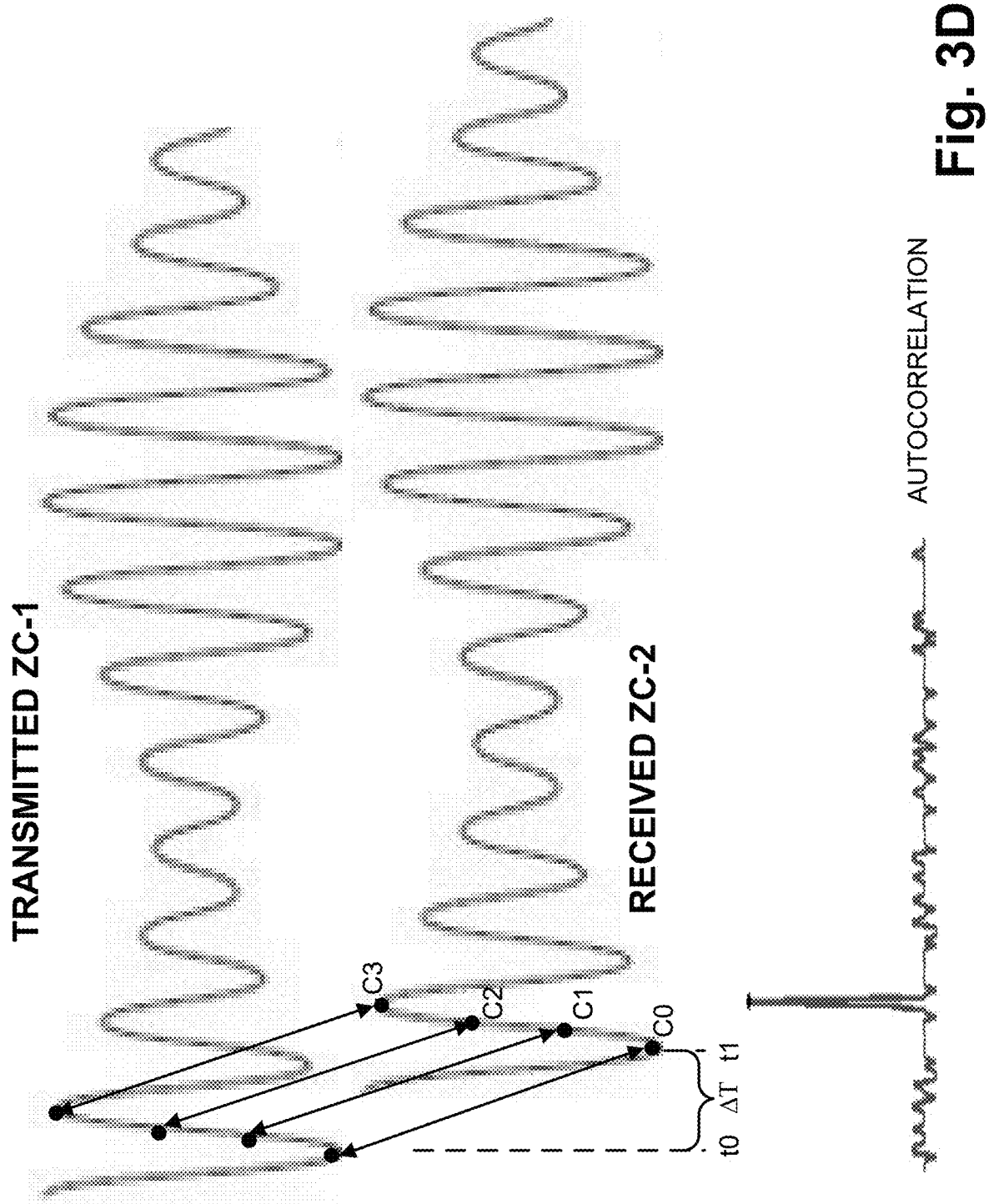
FIG. 3D is a diagram illustrating another exemplary process that determines a phase difference between position reference signals.

According to another exemplary embodiment, referring to FIG. 3D, in response to calculating the correlation peak and time difference, wireless station 110 calculates a phase difference between the transmitted and the received position reference signals. For example, wireless station 110 may search for matching code points between the transmitted and the received position reference signals based on the position in time of the correlation peak and within a time window. The time window may depend on various characteristics of the transmitted reference signal, such as the type of waveform (e.g., pulse, sine, triangular, etc.), the periodicity, etc. According to this example, assume the position reference signal is sinusoidal with a known periodicity. Based on the time window of the correlation peak and its position, wireless station 110 may search and attempt to match interpolated code point values (e.g., specific (e.g., −5) or approximate (e.g., −5.1 through −4.9) amplitude values) between the transmitted and received ZC sequences. For example, wireless station 110 may reconstruct the received reference signal by searching and matching a series of interpolated code points, such as code points C0, C1, C2, and C3 between the transmitted and the received position reference signals using the correlation peak as a time alignment referent. The number and the positions of the code points C0, C1, C2, and C3 are purely exemplary. The greater the number of code point values that may be matched, the more accurate a phase difference may be calculated. The time difference(s) between one or more code point values represents the phase difference. For example, the time difference between code points C3 (e.g., peak code point values) may yield a finer granularity of time difference compared to the time difference calculated based on the detection of the correlation peak.

Figure 2K:
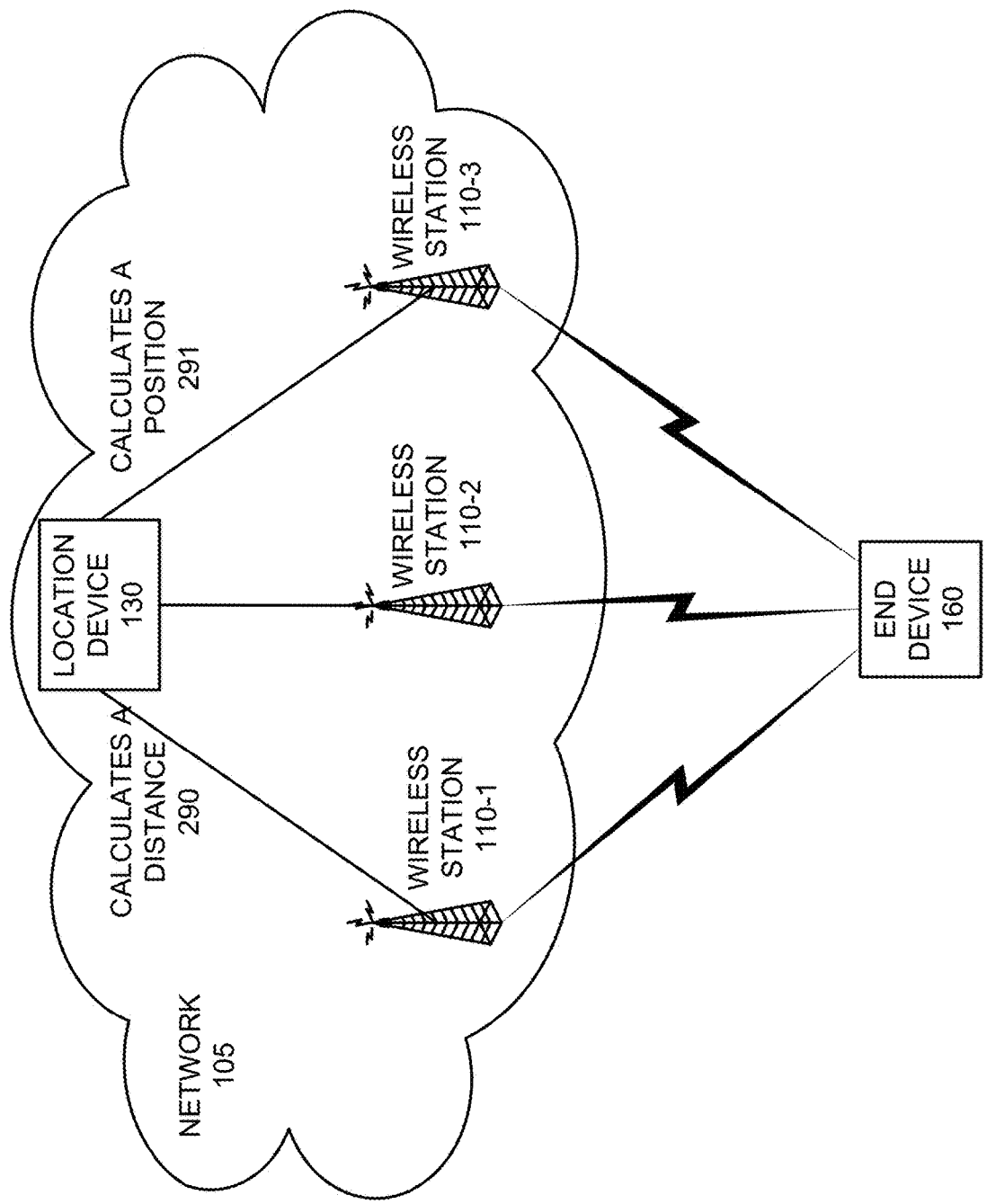
Figure 2L:
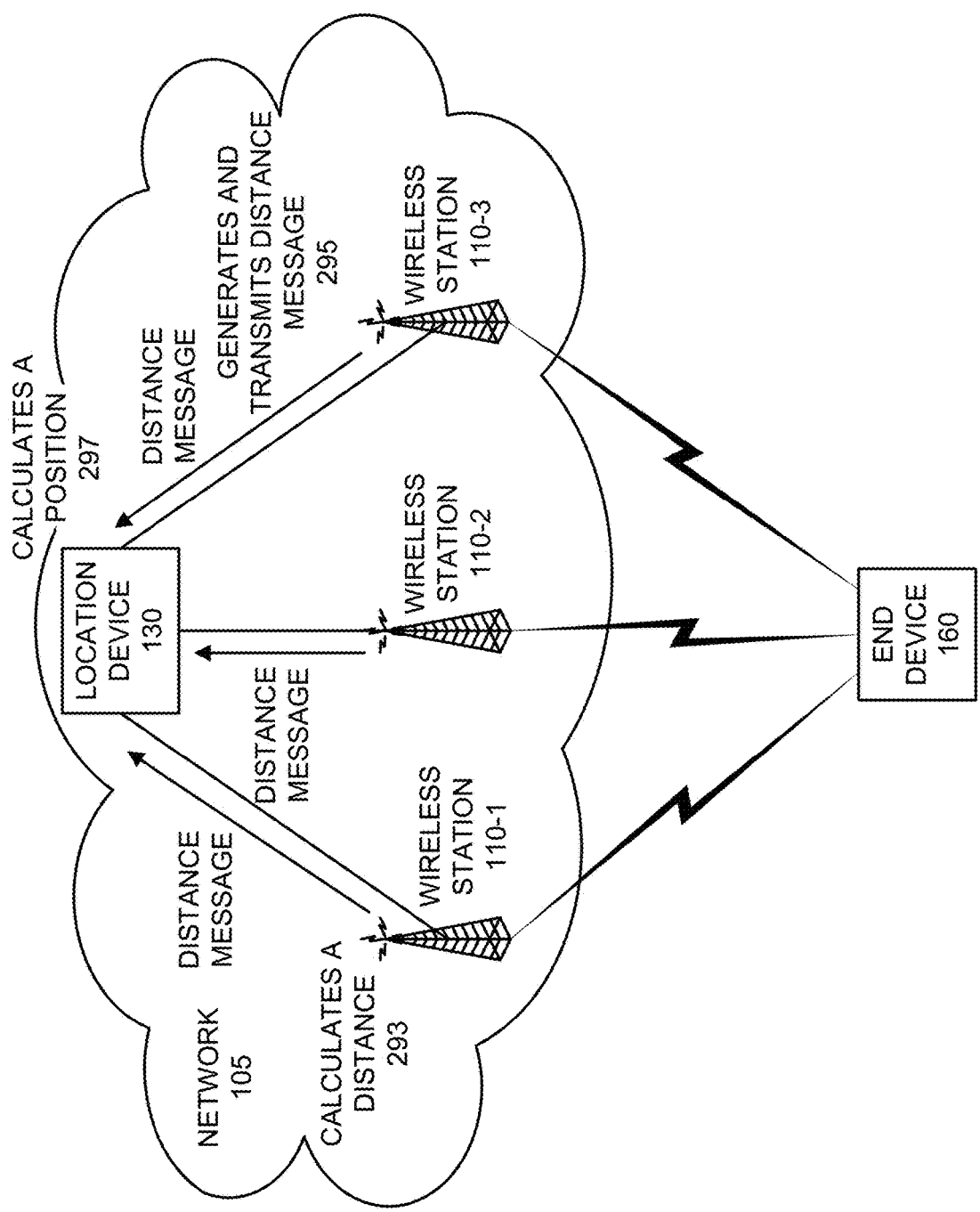

According to an exemplary implementation, wireless station 110 transmits the calculated timing offset value to location device 130. For example, referring to FIG. 2J, each wireless station 110 generates and transmits distance message 288 to location device 130. According to an exemplary implementation, the distance message includes the timing offset value. Additionally, the distance message includes a timestamp (e.g., date and time) indicating when the modified position reference signal was transmitted by end device 160 and an identifier of end device 160. In response to receiving the distance messages, as illustrated in FIG. 2K, location device 130 calculates a distance 290 for each wireless station 110. Based on the calculated distances, location device 130 calculates a position 291 for end device 160. For example, location device 130 may use a trilateration algorithm, a multilateration algorithm, or other well-known method (e.g., use of nonlinear equations) that calculates the position of end device 160.

According to another exemplary implementation, wireless station 110 calculates the distance based on the calculated timing offset value. For example, referring to FIG. 2L, each wireless station 110 calculates a distance 293. In response to calculating the distance, each wireless station 110 generates and transmits distance message 295 to location device 130. According to an exemplary implementation, the distance message includes the distance, a timestamp pertaining to the distance, and an identifier of end device 160. In response to receiving the distance messages, location device 130 calculates a position 297 of end device 160.

Although FIGS. 2A-2L illustrate an exemplary positioning service process, according to other exemplary scenarios, the positioning service process may include additional, different, and/or fewer operations. For example, the positioning service may continue to operate while end device 160 remains connected to an access network, transitions to various states (e.g., connected, idle, registered, deregistered, etc.), performs other procedures (e.g., handover, reestablish RRC, cell reselection, etc.). In the LTE context, the positioning service may operate in terms of, for example, when distance and location calculating and updating may occur, according to LTE network scheduling and management methods.

The content of the messages described are exemplary. According to other exemplary implementations, the content of the messages may be different. For example, according to other implementations, other types of end device identifiers may be used, such as an International Mobile Subscriber Identity (IMSI), a Temporary Mobile Subscriber Identity (TMSI), an International Mobile Station Equipment Identity (IMEI), a Mobile Equipment Identifier (MEID), or some other type of end device identifier, user identifier, and/or a network address (e.g., an Internet Protocol (IP) address, a Media Access Control (MAC) address, etc.). Additionally, or alternatively, other types of wireless station identifiers may be used.

FIG. 4 is a diagram illustrating exemplary components of a device 400 that may correspond to one or more of the devices described herein. For example, device 400 may correspond to components of wireless station 110, location device 130, and end device 160. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to wireless station 110, software 420 may include an application that, when executed by processor 410, provides the functions of the positioning service, as described herein. Also, location device 130 may include an application that, when executed by processor 410, provides the function the functions of the positioning service, as described herein. Similarly, end device 160 may include an application that, when executed by processor 410, provides the functions of the positioning service, as described herein. Software 420 may also include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces. Communication interface 425 may include one or multiple wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
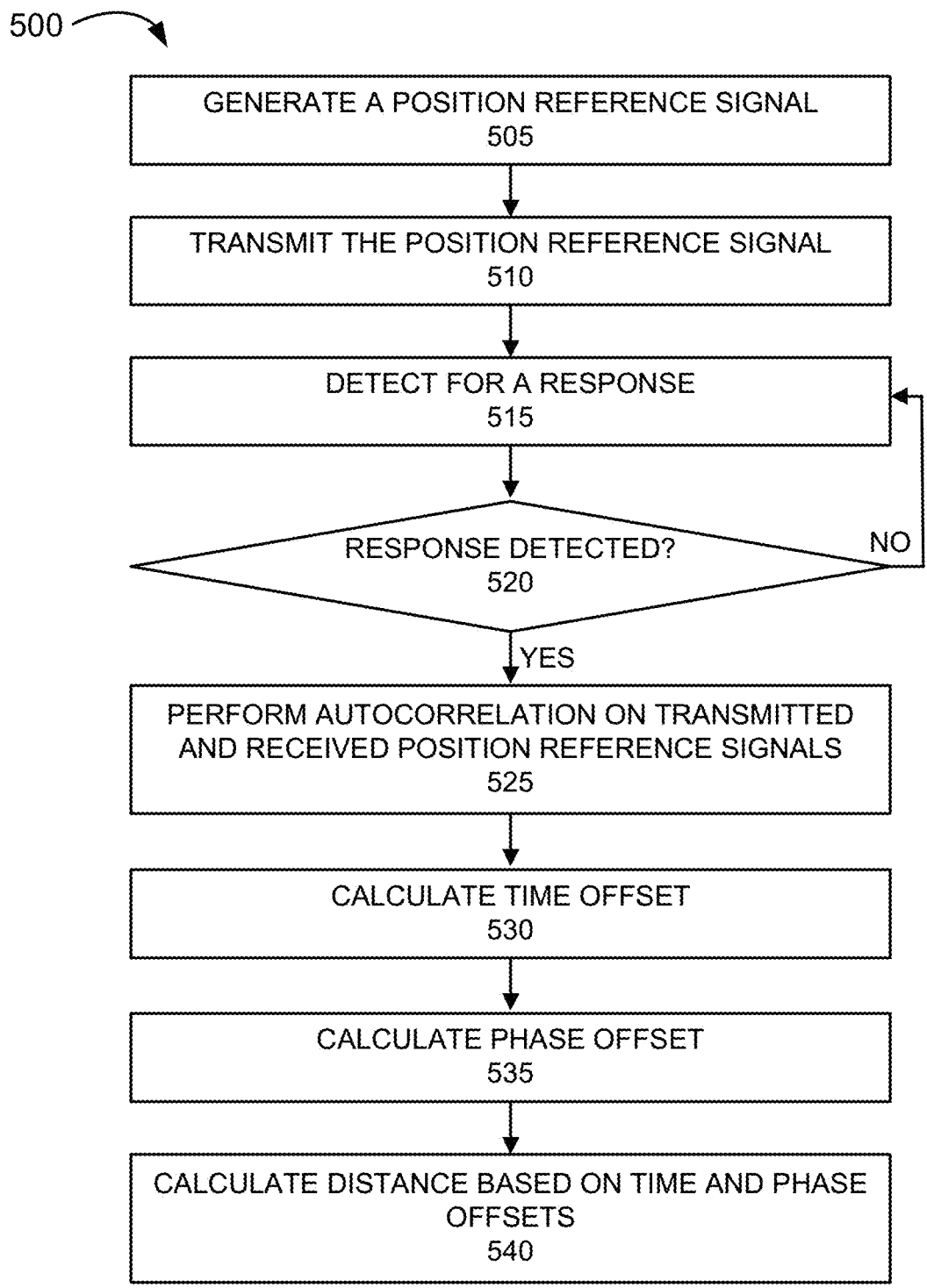
FIG. 5 is a flow diagram illustrating an exemplary process of an exemplary embodiment of the positioning service.

FIG. 5 is a flow diagram illustrating an exemplary process 500 pertaining to the positioning service. Process 500 is directed to a process previously described above with respect to FIGS. 2A-2L, as well as elsewhere in this description. According to an exemplary embodiment, wireless station 110 performs steps of process 500. For example, processor 410 executes software 420 to perform the steps illustrated in FIG. 5 and described herein.

Referring to FIG. 5, in block 505, a position reference signal is generated. For example, wireless station 110 may generate a position reference signal in response to a triggering event. For example, the triggering event may be in response to assigning and transmitting an identifier to end device 160 (e.g., C-RNTI). According to other examples, the triggering event may be based on a schedule, an invocation of another procedure (e.g., a handover, etc.), the state of end device 160, or other context. As previously described, the position reference signal may include an identifier of wireless station 110. For example, the identifier of wireless station 110 may be implemented as the PCI of wireless station 110. Additionally, the position reference signal may be encoded using a perfect polyphase coding scheme (e.g., a ZC sequence). Additionally, for example, the position reference signal may be implemented as a burst signal in which the identifier of wireless station 110 is repeated multiple times.

In block 510, the position reference signal is transmitted. For example, wireless station 110 transmits the position reference signal. As previously described, wireless station 110 may broadcast, multicast, or unicast the position reference signal via a downlink channel. Additionally, for example, wireless station 110 may transmit the position reference signal in accordance with a schedule among other wireless stations 110. By way of further example, wireless station 110 may transmit the position reference signal within an assigned time window.

In block 515, detect for a response. For example, in response to transmitting the position reference signal, wireless station 110 listens for a response to the transmitted position reference signal. As previously described, for example, wireless station 110 may listen for a response within the assigned time window.

In block 520, it is determined whether a response is detected. For example, when it is determined that a response is not received (block 520—NO), process 500 returns to block 515.

When it is determined that a response is detected (block 520—YES), autocorrelation is performed on the transmitted and received position reference signals (block 525). For example, wireless station 110 receives a modified position reference signal from end device 160. For example, the modified position reference signal includes the C-RNTI (or other end device identifier of end device 160) and the content of the position reference signal (e.g., the identifier of wireless station 110). Additionally, the modified position reference signal may be encoded using a perfect polyphase coding scheme (e.g., a ZC sequence). Additionally, for example, the modified position reference signal may be implemented as a burst signal in which the identifier of wireless station 110 and the identifier of end device 160 are each repeated multiple times. In response to the receipt of the modified position reference signal, wireless station 110 performs autocorrelation relative to the transmitted position reference signal and the received modified position reference signal. As previously described, wireless station 110 may invert the modified position reference signal due to the inversion created at end device 160.

In block 530, a time offset is calculated. For example, wireless station 110 searches for a peak of a correlator output of the ZC sequences occurring within a timing window. For example, wireless station 110 performs sliding window searches to determine the time offset between the transmitted position reference signal and the received modified position reference signal.

In block 535, a phase offset is calculated. For example, in response to calculating the time offset, wireless station 110 calculates a phase difference between the transmitted position reference signal and the received modified position reference signal. For example, wireless station 110 may match code points between the transmitted and the received position reference signals. By way of further example, as previously described, wireless station 110 matches the code points between the transmitted and the received position reference signals. Based on the matching of interpolated code points, wireless station 110 calculates the phase offset.

In block 540, a distance is calculated based on the time and phase offsets. For example, wireless station 110 calculates a distance between wireless station 110 and end device 160 based on the calculated time and phase differences. According to other examples, wireless station 110 transmits the time and phase offsets to another device (e.g., location device 130).

Although FIG. 5 illustrates an exemplary process 500 of the positioning service, according to other embodiments, process 500 may include additional operations, fewer operations, and/or different operations than those illustrated in FIG. 5 and described herein.

Figure 6:
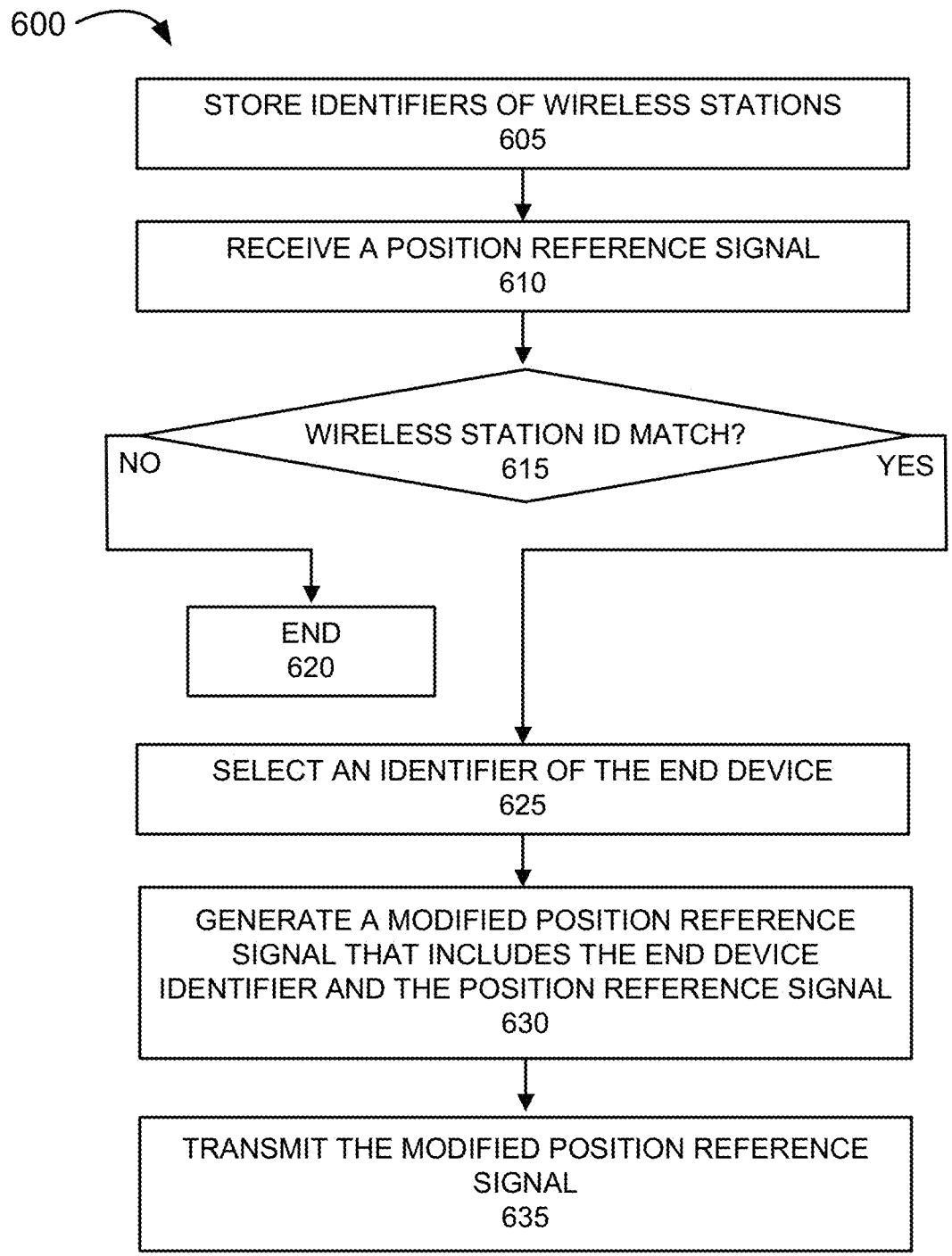
FIG. 6 is a flow diagram illustrating another exemplary process of an exemplary embodiment of the positioning service.

FIG. 6 is a flow diagram illustrating an exemplary process 600 pertaining to the positioning service. Process 600 is directed to a process previously described above with respect to FIGS. 2A-2L, as well as elsewhere in this description. According to an exemplary embodiment, end device 160 performs steps of process 600. For example, processor 410 executes software 420 to perform the steps illustrated in FIG. 6 and described herein.

Referring to FIG. 6, block 605, identifiers of wireless stations may be stored. For example, end device 160 may store identifiers of wireless stations 110 that end device 160 previously encountered. By way of further example, end device 160 may store PCIs of wireless stations 110 based on a cell search procedure.

In block 610, a position reference signal is received. For example, end device 160 may receive a position reference signal from wireless station 110. As previously described, the position reference signal may include an identifier of wireless station 110. For example, the identifier of wireless station 110 may be implemented as the PCI of wireless station 110. Additionally, the position reference signal may be encoded using a perfect polyphase coding scheme (e.g., a ZC sequence). Additionally, for example, the position reference signal may be implemented as a burst signal in which the identifier of wireless station 110 is repeated multiple times.

In block 615, it is determined whether a match exists with an identifier of a wireless station. For example, end device 160 determines whether an identifier of wireless station 110, which is included in the position reference signal, matches one of the stored wireless station identifiers. For example, end device 160 may decode the position reference signal and identify the identifier of wireless station 110. Thereafter, end device 160 may compare the identifier of wireless station 110 with the previously stored identifiers of wireless stations 110.

When it is determined that a match does not exist (block 615—NO), process 500 may end (block 620). For example, end device 160 may not transmit a response to the received position reference signal. According to other examples, end device 160 may continue process 500, despite that a match does not exist, to block 625.

When it is determined that a match exists (block 615—YES), an identifier of an end device is selected (block 625). For example, end device 160 may select a stored identifier of end device 160 in response to determining that the match exists. For example, the identifier of end device 160 may be implemented as a C-RNTI or some other identifier (e.g., IMSI, etc.).

In block 630, a modified position reference signal, which includes the identifier of the end device and the position reference signal, is generated. For example, end device 160 generates the modified position reference signal that includes the C-RNTI (or other end device identifier) and content of the position reference signal (e.g., the identifier of wireless station 110). Additionally, the modified position reference signal may be encoded using a perfect polyphase coding scheme (e.g., a ZC sequence). Additionally, for example, the modified position reference signal may be implemented as a burst signal in which the identifier of wireless station 110 and the identifier of end device 160 are each repeated multiple times.

In block 635, the modified position reference signal is transmitted. For example, end device 160 transmits the modified position reference signal to wireless station 110. As previously described, end device 160 may receive the position reference signal and transmit the modified position reference signal within a time window prescribed for the positioning service. For example, end device 160 may receive and transmit within a same sub-frame of a radio frame.

Although FIG. 6 illustrates an exemplary process 600 of the positioning service, according to other embodiments, process 600 may include additional operations, fewer operations, and/or different operations than those illustrated in FIG. 6 and described herein. For example, according to other exemplary embodiments, blocks 615 and 615 may be omitted.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more unless the context clearly indicates otherwise. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium may include one or more of the storage mediums described in relation to memory/storage 415.

No element, act, or instruction described in the present application should be construed as critical or essential to the embodiments described herein unless explicitly described as such.

What is claimed is:

1. A method comprising:
   generating, by a wireless station of a wireless access network, a first signal that includes a perfect polyphase-encoding of an identifier that identifies the wireless station;
   transmitting, by the wireless station, the first signal;
   receiving, by the wireless station and from an end device, a second signal that is responsive to the first signal and includes a perfect polyphase-encoding of the identifier that identifies the wireless station, an identifier that identifies the end device, and data indicating a time period from receipt of the first signal, by the end device, to a transmission of the second signal by the end device;
   autocorrelating, by the wireless station, the first signal and the second signal;
   calculating, by the wireless station and in response to the autocorrelating, a time difference between the first signal and the second signal;
   calculating, by the wireless station and in response to the calculating of the time difference, a phase difference between the first signal and the second signal; and
   calculating, by the wireless station and in response to the calculating of the phase difference, a distance between the wireless station and the end device based on the time difference, the phase difference, the identifier that identifies the wireless station, and the identifier that identifies the end device.

2. The method of claim 1, wherein the first signal is encoded as a Zaduff-Chu sequence that includes a repetition of a physical cell identity (PCI) of the wireless station, wherein the second signal is encoded as a Zaduff-Chu sequence that includes the repetition of the PCI of the wireless station and a repetition of the identifier that identifies the end device, and wherein the PCI corresponds to the identifier that identifies the wireless station.

3. The method of claim 1, further comprising:
   inverting, by the wireless station and in response to the receiving, the second signal; and
   decoding, by the wireless station, the identifier that identifies the end device before performing the autocorrelating.

4. The method of claim 1, wherein the autocorrelating comprises:
   searching, by the wireless station and within a time window, for a correlation peak output from a correlator; and
   detecting, by the wireless station and based on the searching, a position of the correlation peak.

5. The method of claim 4, and wherein the calculating the time difference comprises:
   calculating, by the wireless station and in response to the detecting, the time difference based on the position of the correlation peak.

6. The method of claim 5, wherein the calculating the phase difference comprises:
   sampling, by the wireless station and in response to the calculating of the time difference, correlation peak data associated with the first signal and the second signal at a rate higher than a periodicity of the first signal and the second signal; and
   calculating, by the wireless station and in response to the sampling, the phase difference between the first signal and the second signal based on one or more values obtained from the sampling.

7. The method of claim 5, wherein the calculating the phase difference comprises:
   searching, by the wireless station and in response to the calculating of the time difference, one or more code point values of the first signal and the second signal that match based on the position of the correlation peak; and
   calculating, by the wireless station and in response to the searching of the one or more code point values, the phase difference between the first signal and the second signal based on the one or more code point values that match.

8. The method of claim 1, wherein the wireless station includes an evolved Node B.

9. A system comprising:
   a wireless station of a wireless access network comprising:

a first communication interface;
a first memory, wherein the first memory stores first instructions; and
a first processor, wherein the first processor executes the first instructions to:
generate a first signal that includes a perfect polyphase-encoding of an identifier that identifies the wireless station;
transmit, via the first communication interface, the first signal;
receive, via the first communication interface and from an end device, a second signal that is responsive to the first signal and includes a perfect polyphase-encoding of the identifier that identifies the wireless station, an identifier that identifies the end device, and data indicating a time period from receipt of the first signal, by the end device, to a transmission of the second signal by the end device;
autocorrelate the first signal and the second signal;
calculate in response to the autocorrelation, a time difference between the first signal and the second signal;
calculate in response to the calculation of the time difference, a phase difference between the first signal and the second signal; and
calculate in response to the calculation of the phase difference, a distance between the wireless station and the end device based on the time difference, the phase difference, the identifier that identifies the wireless station, and the identifier that identifies the end device.

10. The system of claim 9, wherein the first signal is encoded as a Zaduff-Chu sequence that includes a repetition of a physical cell identity (PCI) of the wireless station, wherein the second signal is encoded as a Zaduff-Chu sequence that includes the repetition of the PCI of the wireless station and a repetition of the identifier that identifies the end device, and wherein the PCI corresponds to the identifier that identifies the wireless station.

11. The system of claim 9, wherein the first processor further executes the first instructions to:
invert the second signal in response to the receipt of the second signal; and
decode the identifier that identifies the end device before performing the autocorrelating.

12. The system of claim 9, wherein the first processor further executes the first instructions to:
generate in response to the calculation of the distance, a message that includes the distance between the wireless station and the end device, the identifier that identifies the wireless station, the identifier that identifies the end device, and a timestamp; and
transmit, via the first communication interface, the message to a location device, wherein the system further comprises:
the location device comprising:
a second communication interface;
a second memory, wherein the second memory stores second instructions; and
a second processor, wherein the second processor executes the second instructions to:
receive, via the second communication interface, the message; and
calculate a position of the end device based on the message.

13. The system of claim 9, wherein the first processor further executes the first instructions to:
search within a time window for a correlation peak output from a correlator;
detect a position of the correlation peak based on the search; and
calculate in response to the detection, the time difference based on the position of the correlation peak.

14. The system of claim 13, wherein the first processor further executes the first instructions to:
sample, in response to the calculation of the time difference, correlation peak data associated with the first signal and the second signal at a rate higher than a periodicity of the first signal and the second signal; and
calculate, in response to the sampling, the phase difference between the first signal and the second signal based on one or more values obtained from the sampling.

15. The system of claim 13, wherein the first processor further executes the first instructions to:
search, in response to the calculation of the time difference, one or more code point values of the first signal and the second signal that match based on the position of the correlation peak; and
calculate, in response to the search of the one or more code point values, the phase difference between the first signal and the second signal based on the one or more code point values that match.

16. A non-transitory computer-readable storage medium storing instructions executable by a processor of a wireless station of a wireless access network, which when executed cause the wireless station to:
generate a first signal that includes a perfect polyphase-encoding of an identifier that identifies the wireless station;
transmit the first signal;
receive from an end device, a second signal that is responsive to the first signal and includes a perfect polyphase-encoding of the identifier that identifies the wireless station, an identifier that identifies the end device, and data indicating a time period from receipt of the first signal, by the end device, to a transmission of the second signal by the end device;
autocorrelate the first signal and the second signal;
calculate in response to the autocorrelation, a time difference between the first signal and the second signal;
calculate in response to the calculation of the time difference, a phase difference between the first signal and the second signal; and
calculate in response to the calculation of the phase difference, a distance between the wireless station and the end device based on the time difference, the phase difference, the identifier that identifies the wireless station, and the identifier that identifies the end device.

17. The non-transitory computer-readable storage medium of claim 16, further storing instructions executable by the processor of the wireless station, which when executed cause the wireless station to:
search within a time window for a correlation peak output from a correlator;
detect a position of the correlation peak based on the search; and
calculate in response to the detection, the time difference based on the position of the correlation peak.

18. The non-transitory computer-readable storage medium of claim 16, wherein the instructions to forward further comprise instructions executable by the processor of the wireless station, which when executed cause the wireless station to:
- invert the second signal in response to the receipt of the second signal, wherein the first signal is encoded as a Zaduff-Chu sequence that includes a repetition of a physical cell identity (PCI) of the wireless station, wherein the second signal is encoded as a Zaduff-Chu sequence that includes the repetition of the PCI of the wireless station and a repetition of the identifier that identifies the end device, and wherein the PCI corresponds to the identifier that identifies the wireless station; and
- decode the identifier that identifies the end device before performing the autocorrelating.

19. The non-transitory, computer-readable storage medium of claim 16, wherein the wireless station includes an evolved Node B.

20. The non-transitory computer-readable storage medium of claim 16, further storing instructions executable by the processor of the wireless station, which when executed cause the wireless station to:
- sample, in response to the calculation of the time difference, correlation peak data associated with the first signal and the second signal at a rate higher than a periodicity of the first signal and the second signal; and
- calculate, in response to the sampling, the phase difference between the first signal and the second signal based on one or more values obtained from the sampling.

* * * * *